(12) United States Patent
Jung et al.

(10) Patent No.: US 9,766,743 B2
(45) Date of Patent: Sep. 19, 2017

(54) MOBILE TERMINAL AND CONTROL METHOD THEREOF

(71) Applicant: LG ELECTRONICS INC., Seoul (KR)

(72) Inventors: Egun Jung, Seoul (KR); Soyoung Bae, Seoul (KR); Yongkyoung Shin, Seoul (KR); Jugwan Eom, Seoul (KR); Hongseok Choi, Seoul (KR); Daemyeong Park, Seoul (KR); Yeongnam Ahn, Seoul (KR); Jungsun Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 137 days.

(21) Appl. No.: 14/725,711

(22) Filed: May 29, 2015

(65) Prior Publication Data

US 2015/0346899 A1    Dec. 3, 2015

(30) Foreign Application Priority Data

May 30, 2014  (KR) .................. 10-2014-0066314
Jul. 11, 2014  (KR) .................. 10-2014-0087596

(51) Int. Cl.
*G06F 3/0488* (2013.01)
*G06F 3/041* (2006.01)
(Continued)

(52) U.S. Cl.
CPC .......... *G06F 3/0416* (2013.01); *G06F 1/1626* (2013.01); *G06F 1/1643* (2013.01); *G06F 1/1694* (2013.01); *G06F 3/017* (2013.01); *G06F 3/0346* (2013.01); *G06F 3/0488* (2013.01); *G06F 3/1423* (2013.01); *G06F 2200/1637* (2013.01); *G06F 2203/04101* (2013.01); *G06F 2203/04803* (2013.01); *G06F 2203/04808* (2013.01); *G09G 5/14* (2013.01);
(Continued)

(58) Field of Classification Search
CPC .... G06F 3/0416; G06F 3/1423; G06F 3/0346; G06F 3/0488; G06F 1/1626; G06F 1/1643; G06F 1/1694; G06F 3/017; G06F 2203/1637; G06F 2203/04803; G09G 2340/0492; G09G 5/34; G09G 2354/00
See application file for complete search history.

(56) References Cited

U.S. PATENT DOCUMENTS

2011/0109572 A1* 5/2011 Deslippe ............. G06F 3/03547
                                                    345/173
2013/0300697 A1* 11/2013 Kim ...................... G06F 1/1626
                                                    345/173

(Continued)

*Primary Examiner* — Ibrahim Khan
(74) *Attorney, Agent, or Firm* — Birch, Stewart, Kolasch & Birch, LLP

(57) ABSTRACT

A mobile terminal including a main body having front, side and rear surfaces; a sensing unit configured to sense a movement of the main body; a display unit including a first region located on the front surface and a second region extending from the first region and located on the side surface; and a controller configured to display first information on the first region of the display unit, activate the second region when the movement of the main body meets a preset condition in a deactivated state of the second region, and display second information associated with the first information on the second region.

11 Claims, 34 Drawing Sheets

(51) Int. Cl.
*G06F 1/16* (2006.01)
*G06F 3/0346* (2013.01)
*G06F 3/01* (2006.01)
*G06F 3/14* (2006.01)
G09G 5/14 (2006.01)
G09G 5/34 (2006.01)

(52) U.S. Cl.
CPC ....... *G09G 5/34* (2013.01); *G09G 2340/0492* (2013.01); *G09G 2354/00* (2013.01)

(56) References Cited

U.S. PATENT DOCUMENTS

2014/0282059 A1* 9/2014 Oh .................. G06F 1/1641
 715/744
2015/0015513 A1* 1/2015 Kwak ................ G06F 3/0416
 345/173

\* cited by examiner

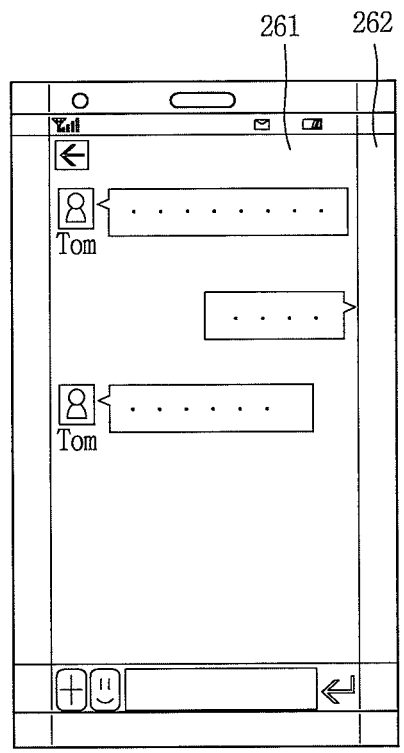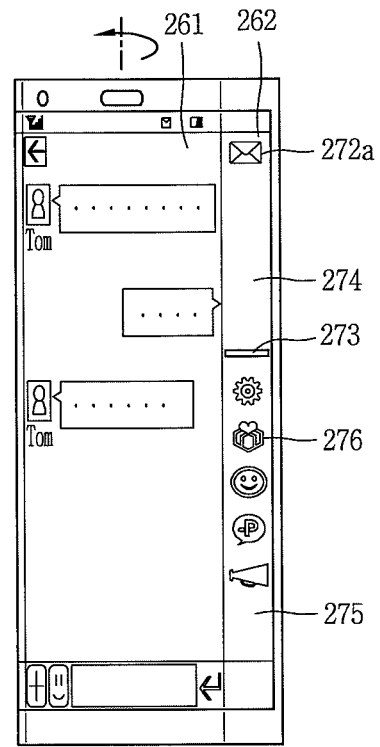

MOBILE TERMINAL AND CONTROL METHOD THEREOF

CROSS-REFERENCE TO RELATED APPLICATION

Pursuant to 35 U.S.C. §119(a), this application claims the benefit of earlier filing date and right of priority to Korean Application No. 10-2014-0066314, filed on May 30, 2014, and Korean Application No. 10-2014-0087596, filed on Jul. 11, 2014, the contents of which are incorporated by reference herein in their entireties.

BACKGROUND OF THE DISCLOSURE

1. Field of the Disclosure

This specification relates to a mobile terminal having a side display unit.

2. Background of the Disclosure

Terminals may be divided into mobile/portable terminals and stationary terminals. Also, the mobile terminals may be classified into handheld terminals and vehicle mount terminals according to whether or not a user can directly carry. A mobile terminal can also capture still images or moving images, play music or video files, play games, receive broadcast and the like, so as to be implemented as an integrated multimedia player.

Many efforts include not only changes and improvement of structural components implementing a mobile terminal but also software improvement to support and improve functions of the terminal. For example, a user interface environment is provided in order for users to easily and conveniently retrieve or select functions. Also, many users want their portable terminals to express their own personalities, and accordingly, various design factors are required for the mobile terminals. The design factors may include structural changes and improvements for users to use the mobile terminal more conveniently.

SUMMARY OF THE DISCLOSURE

Therefore, an aspect of the detailed description is to provide a mobile terminal capable of outputting information on a side display unit in response to a movement (or a placed state) of the terminal.

Another aspect of the detailed description is to provide a mobile terminal enabling a new type of user input and output of the terminal, different from the related art.

To achieve these and other advantages and in accordance with the purpose of this specification, as embodied and broadly described herein, there is provided a mobile terminal including a main body having front, side and rear surfaces, a sensing unit that is configured to sense a movement of the main body, a display unit that is provided with a first region located on the front surface and a second region extending from the first region and located on the side surface, and a controller that is configured to activate the second region when the movement of the main body meets a preset condition in a deactivated state of the second region and to output information associated with information output on the first region on the second region.

In one exemplary embodiment disclosed herein, the controller may output control information, which is provided to control functions associated with the information output on the first region, on the second region, and the control information output on the second region may include selectable graphic images.

In one exemplary embodiment disclosed herein, the controller may execute a function associated with a selected at least one graphic image when the at least one graphic image of the graphic images output on the second region is selected, and output screen information related to the associated function on the first region.

In one exemplary embodiment disclosed herein, the movement of the main body meeting the preset condition may be a movement that the main body is tilted in a first direction. The controller may deactivate the second region when the main body is tilted in a second direction opposite to the first direction after the second region is activated in response to the tilting in the first direction.

In one exemplary embodiment disclosed herein, the controller may be configured to determine relative positions between the main body and the user. An activation or deactivation of the second region may be decided based on the determination result when the movement of the main body meets the preset condition.

The controller may monitor the relative positions between the main body and the user through a camera while the second region is activated. The controller may deactivate the second region when the second region located on the side surface of the main body is out of a range of the user's eyes according to the monitoring result.

In one exemplary embodiment disclosed herein, the sensing unit may include a touch sensor that is configured to sense a touch input applied to the display unit. The preset condition may include a case where a touch area of the touch input applied to the display unit is more than a preset range.

The controller may terminate the output of the information with respect to the second region, by using the change in the touch area of the touch input applied to the display unit while the second region is activated.

In one exemplary embodiment disclosed herein, the display unit may include a third region located opposite to the second region. The movement of the main body meeting the preset condition may be a movement that the main body is tilted in a first direction or a second direction opposite to the first direction. Here, the controller may activate the second region when the main body is tilted in the first direction, and activate the third region when the main body is tilted in the second direction.

Control information output on the activated second region may depend on the information output on the first region. On the activated third region may be output control information which is preset, independent of the information output on the first region.

In one exemplary embodiment disclosed herein, the controller may further output unchecked event information on the second region when the main body moves to meet the preset condition while the unchecked event information is present.

The second region may be divided into at least two regions. The information associated with the information output on the first region may be output on one of the divided at least two regions, and the unchecked event information may be output on the other divided region.

In one exemplary embodiment disclosed herein, detailed information related to the unchecked event information may be output on one of the first region and the second region when a preset touch input is applied to the region on which the unchecked event information is output of the second region.

The activated state of the first region may be maintained even when the second region is activated in response to the movement of the main body meeting the preset condition.

The first region after the second region is activated may be darker in brightness than that before the second region is activated.

In one exemplary embodiment disclosed herein, information corresponding to a function set by a user may further be output on one region of the second region, in addition to the information associated with the information output on the first region.

To achieve these and other advantages and in accordance with the purpose of this specification, as embodied and broadly described herein, there is provided a control method of a mobile terminal which includes a main body having front, side and rear surfaces, and a display unit having a first region located on the front surface and a second region located on the side surface, the control method including displaying information on the first region, sensing a movement of the main body while the information is displayed on the first region, and activating the second region when the movement of the main body meets a preset condition in a deactivated state of the second region and then outputting on the activated second region information associated with information output on the first region.

Also, a mobile terminal according to the present disclosure may include a main body having front, side and rear surfaces, a sensing unit that is configured to sense a movement of the main body, a display unit that is provided with a first region located on the front surface and a second region extending from the first region and located on the side surface, and a controller that is configured to activate the second region when the movement of the main body meets a preset condition in a deactivated state of the second region and to output information associated with information output on the first region on the activated second region, wherein the controller may execute a control associated with the second region based on a touch input applied to the first region while the associated information is output on the second region.

In one exemplary embodiment disclosed herein, the controller may change at least part of the associated information output on the second region, in response to the touch input applied to the first region.

In one exemplary embodiment disclosed herein, the controller may process the touch input, applied to the first region while the second region is activated, as a scroll function with respect to the associated information.

In one exemplary embodiment disclosed herein, the associated information may be scrolled by a touch length of a drag touch when the drag touch is applied to the first region while the associated information is output on the second region.

In one exemplary embodiment disclosed herein, the movement of the main body meeting the preset condition may be a movement that the main body is tilted in one direction. The controller may deactivate the second region when the main body is tilted in a second direction opposite to the first direction after the second region is activated by the tilting in the first direction.

In one exemplary embodiment disclosed herein, the controller may process a touch applied to the first region as a control command for the second region when the touch is applied to the first region in the state the that the main body has moved by the tilting in the first direction, and process the touch applied to the first region as a control command for the first region when the main body is tilted in the second direction opposite to the first direction, after being tilted in the first direction.

In one exemplary embodiment disclosed herein, the controller may output control information, which is provided to control functions associated with the information output on the first region, on the second region. The control information output on the second region may include selectable graphic images. At least one of the graphic images may be selected in response to a touch input applied to the first region.

In one exemplary embodiment disclosed herein, the controller may execute a function associated with a selected at least one graphic image when the at least one graphic image is selected on the second region, and then output screen information related to the associated function on the first region.

In one exemplary embodiment disclosed herein, the touch may be a drag touch applied in a direction moved from the second region to the first region.

In one exemplary embodiment disclosed herein, a guide image may be output on one of the graphic images included in the second region when a first touch is applied to the first region. The guide image may be moved from the one graphic image to another graphic image when a second touch, consecutive to the first touch, is applied to the first region and dragged in one direction while the guide image is output. The graphic image on which the guide image is output may be selected when a touch is released on one of the first touch and the second touch.

In one exemplary embodiment disclosed herein, the first touch may be a tap touch maintained for more than a preset time.

In one exemplary embodiment disclosed herein, the graphic images may be arranged on the second region along a lengthwise direction of the main body. The controller may move the guide image output on the one graphic image to another graphic image along the direction that the second touch is applied.

A control method of a mobile terminal which includes a main body having front, side and rear surfaces, and a display unit having a first region located on the front surface and a second region located on the side surface, the control method including displaying information on the first region, sensing a movement of the main body while the information is displayed on the first region, activating the second region when the movement of the main body meets a preset condition in a deactivated state of the second region and then outputting on the activated second region information associated with information output on the first region, and executing a control associated with the second region using a touch applied to the first region while the associated information is output on the second region.

In one exemplary embodiment disclosed herein, in the step of executing the control associated with the second region, the touch applied to the first region in the activated state of the second region may be processed as an execution of a scroll function for the associated information, and at least part of the associated information output on the second region may change in response to the processing.

In one exemplary embodiment disclosed herein, control information for controlling functions associated with the information output on the first region may be output on the second region. The control information output on the second region may include selectable graphic images. At least one of the graphic images may be selected by a touch applied to the first region.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage and the like.

Figure 1A:
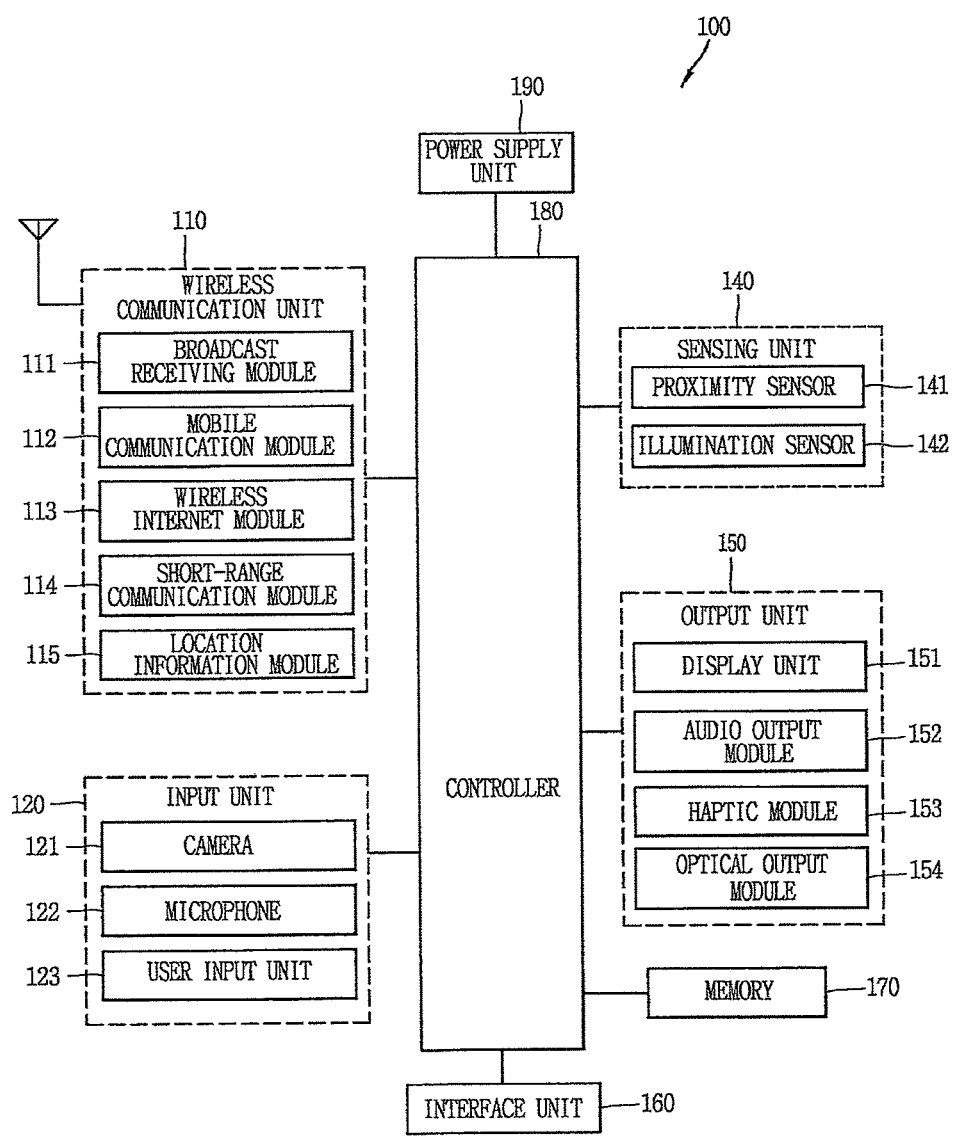
FIG. 1A is a block diagram of a mobile terminal in accordance with one exemplary embodiment of the present disclosure.
Figure 1B:
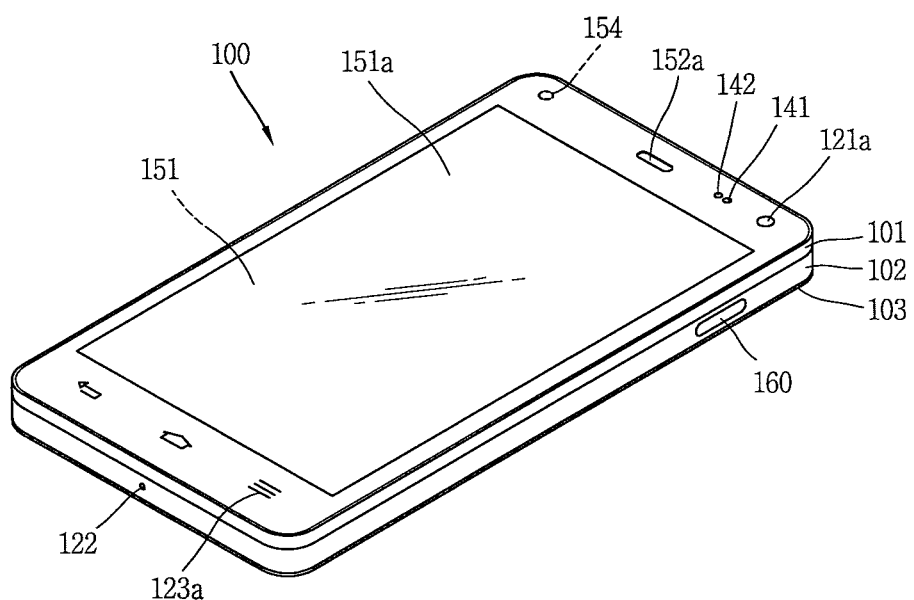
FIGS. 1B and 1C are conceptual views of one example of a mobile terminal, viewed from different directions.
Figure 1C:
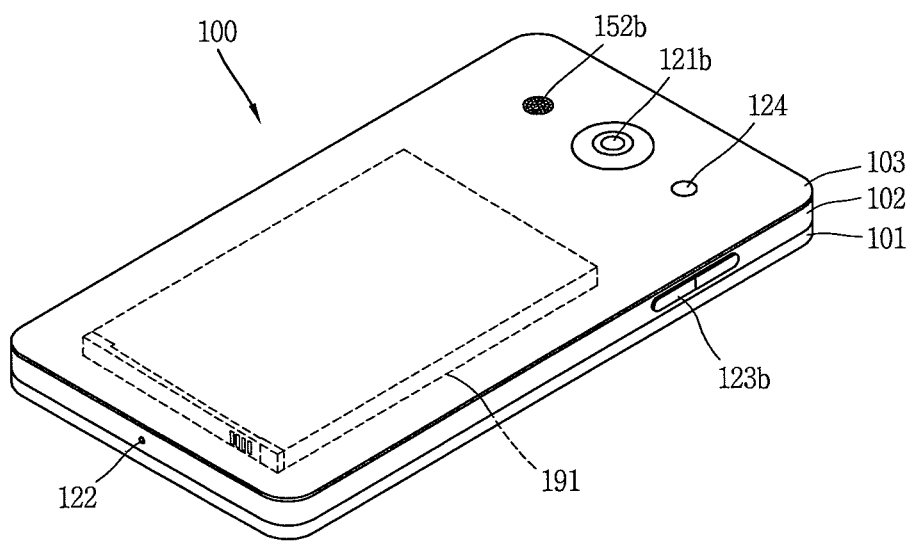

Reference is now made to FIGS. 1A to 1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks. The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the aforementioned various components, or activating application programs stored in the memory 170. Also, the controller 180 controls some or all of the components illustrated in FIG. 1A according to the execution of an application program that have been stored in the memory 170. In addition, the controller 180 can control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100. First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Enhanced Voice-Data Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-advanced (LTE-A) and the like). Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

Meanwhile, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like. If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. Also, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like. The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control operations relating to application programs and the general operations of the mobile terminal 100. For example, the controller 180 can set or release a lock state for restricting a user from inputting a control command with respect to applications when a status of the mobile terminal meets a preset condition. The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces. The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output module 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side due to the touch screen or rear input unit replacing at least some functions of the first manipulation unit 123a provided on the front of the terminal body, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123. The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities. A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication. At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2A:
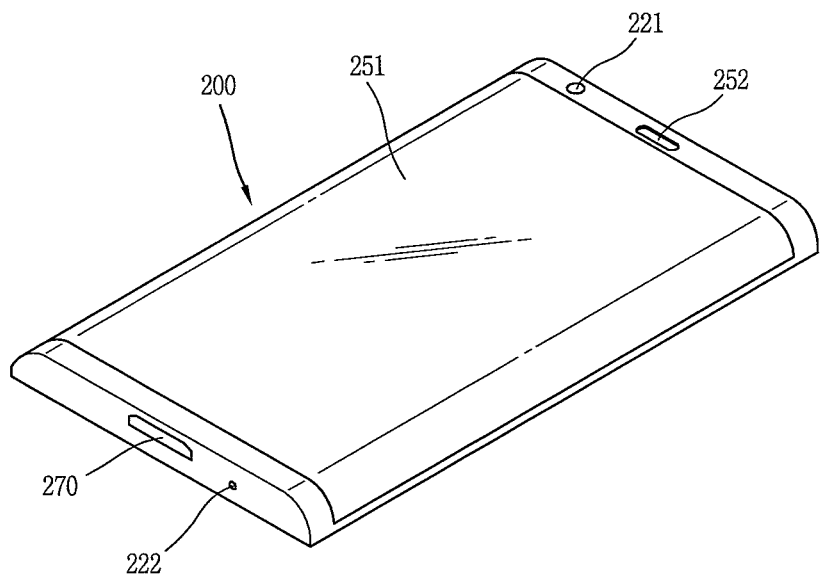
FIG. 2A is a front perspective view illustrating another example of a mobile terminal in accordance with the present disclosure.
Figure 2B:
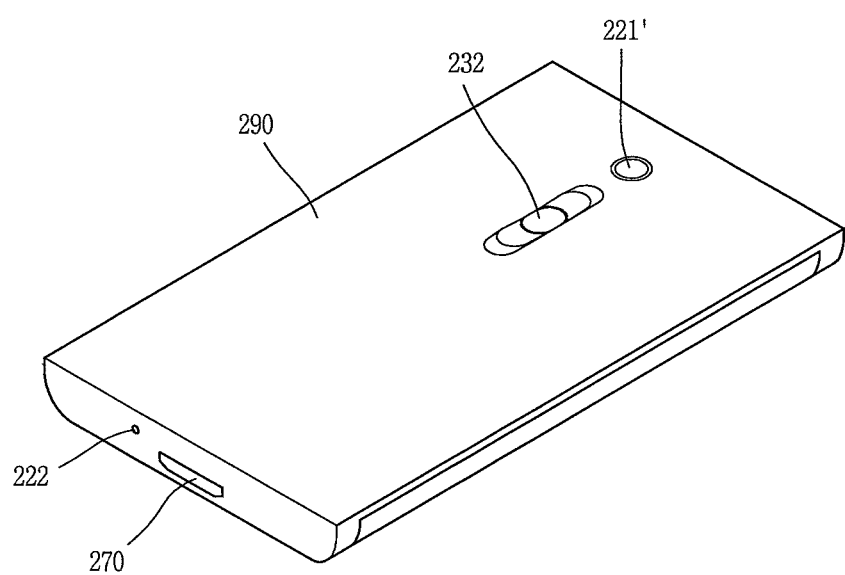
FIG. 2B is a rear perspective view of the mobile terminal illustrated in FIG. 2A.

Meanwhile, a mobile terminal according to the present disclosure may have various design forms. Hereinafter, a mobile terminal having a side display unit and a user interface utilizing the side display unit will be described as one of structural changes and improvements. FIG. 2A is a front perspective view illustrating another example of a mobile terminal in accordance with the present disclosure, and FIG. 2B is a rear perspective view of the mobile terminal illustrated in FIG. 2A.

A mobile terminal 200 disclosed herein has a bar-type phone body. By way of a non-limiting example only, the mobile terminal may also be applied to various structures, such as slide-type, folder-type, swing-type, and swivel-type in which two and more bodies are combined with each other in a relatively movable manner, and combinations thereof.

The body includes a case (casing, housing, cover, etc.) forming an appearance. In this exemplary embodiment, the case may be divided into a front case 201 and a rear case 202 (see FIGS. 2A and 2B). Various electronic components are incorporated into a space formed between the front case 201 and the rear case 202. At least one middle case may be additionally positioned between the front case 201 and the rear case 202. The cases may be formed by injection-molding synthetic resin or may be formed of a metal, for example, stainless steel (STS), aluminum (Al), titanium (Ti), or the like.

The terminal body, generally, the front case 201 may be provided with a display unit 251, an audio output module 252, a camera module 221, and the like. An interface unit 270 and the like may be disposed on side surfaces of the front case 201 and the rear case 202.

The display unit 251 occupies most of a principal surface of the front case 201. That is, the display unit 251 is disposed on an entire surface of the terminal, and outputs visual information. The display unit 251 disclosed herein has an extended shape up to another surface of the terminal, as well as the front surface of the terminal. In more detail, the display unit 251 includes a first region 261 located on the front surface, and a second region 262 extending from the first region 261 and located on the side surface of the terminal body. Here, the side surface may be a surface visible by the user when the user views the mobile terminal at the side.

At least part of the second region 262 may be located on the front surface. For example, the second region 262 may be formed along the side surfaces and the front surface of the terminal. Here, whether or not the second region 262 is visible on the front surface may be decided by a structure that the first and second region 261 and 262 are formed on the display unit 251.

For example, a window which is disposed on a top surface of the display unit 251 is configured in a manner that both side surfaces thereof are curved. Accordingly, the appearance of the front surface and the side surface of the terminal body is defined by the window. Therefore, the first region 261 and the second region 262 may be connected without a physical boundary therebetween. Here, the display unit 251 may be provided with a display device which is formed in a curved shape and embedded to correspond to the window. As another example, the display unit 251 may be a flexible display. The flexible display refers to a display which is curved, bent, twisted, folded, rolled by an external force. Here, the flexible display unit may include both a general flexible display and an electronic paper.

The typical flexible display is generally formed as a lightweight, non-fragile display, which still exhibits characteristics of a conventional flat panel display, but is instead fabricated on a flexible substrate which can be deformed as noted previously. The term e-paper refers to a display technology employing the characteristic of a general ink, and is different from the conventional flat panel display in view of using reflected light. E-paper is generally understood as changing pictures or text using a twist ball or via electrophoresis using a capsule. According to the characteristic of the flexible material, a terminal main body in which both side surfaces of the display unit are curved may be configured.

The audio output module 252 and the camera module 221 may be disposed on a region adjacent to one of both end portions of the display unit 251, and a front input unit (not illustrated) and a microphone 222 may be disposed on a region adjacent to the other end portion. The front input unit is an example of a user input unit 230 (see FIG. 1), which may include a plurality of manipulation units. The manipulation units may be referred to as a manipulating portion, and may employ any tactile method that allows the user to perform manipulation with applying a tactile feeling.

Also, the display unit 251 may form a touch screen along with a touch sensor, and in this instance, the touch screen may be a user input unit. This may allow for employing a configuration without a front input unit on the front surface of the terminal. Here, the mobile terminal may be configured such that an input manipulation with respect to the terminal main body can be allowed merely by the display unit 251 and a rear input unit 232 to be explained later.

Referring to FIG. 2B, the rear surface of the terminal body, namely, the rear case 202 may be further provided with a camera module 221'. The camera module 221' may have an image capturing direction that is substantially opposite to the image capturing direction of the camera module 221 (see FIG. 2A), and have different pixels from the camera module 221. For example, the camera module 221 has a smaller number of pixels to capture an image of the user's face and transmits such image to another party, and the camera module 221' has a larger number of pixels to capture an image of a general object and not immediately transmits it in most cases. The first and the second camera modules 221 and 221' may be installed on the terminal body such that they can be rotatable or popped up.

A flash and a mirror may be additionally disposed adjacent to the camera module 221.' When an image of a subject is captured with the camera module 221', the flash may illuminate the subject. The mirror may allow the user to see himself or herself when he or she wants to capture his or her own image (i.e., self-image capturing) by using the camera module 221.' An audio output unit may be further disposed on the rear surface of the terminal body. The rear audio output module may implement stereophonic sound functions in conjunction with the front audio output module 252 (refer to FIG. 2A), and may be also used for implementing a speaker phone mode for call communication.

That is, the front audio output module 252 (first audio output module) configured as a receiver may be located on the front surface of the terminal, and the second audio output module configured as a speaker may be located on the rear surface. However, the present disclosure may not be limited to this, and the second audio output module may be provided on the side surface of the terminal. The terminal body is provided with a power supply unit for supplying power to the mobile terminal 200. The power supply unit 290 may be embedded in the terminal body or detachably coupled to an outside of the terminal body.

As illustrated, a rear input unit 232 may be disposed on the rear surface of the terminal body. The rear input unit 232, for example, may be located below the camera module 221.' The rear input unit 232 can be manipulated by a user to provide input of a command for controlling an operation of the mobile terminal 200. The input may be used in a variety of different ways. For example, the rear input unit 232 may be manipulated by the user to input commands such as power on/off, start, end, scroll, and command such as a control of a volume level output from the audio output module 252, switching of a touch recognition mode of the display unit 251, and the like. The present disclosure, however, may not be limited to this, and the terminal may include one or both of the front input unit and the rear input unit 232.

As aforementioned, the controller 180 (see FIG. 1) may control the functions of the terminal by using the display unit disposed on the side surface of the terminal. As one of such control methods, the present disclosure proposes a method of controlling an activation or deactivation of a side display unit using a movement (or a placed state) of a terminal. Hereinafter, description will be given in more detail of a side display unit and a method of controlling a function of a terminal using a movement (or a placed state) of the terminal, with reference to the accompanying drawings.

For the sake of explanation, a first region refers to a display region (or a front display unit) located on a front surface of a main body, which has front, side and rear surfaces, and a second region refers to a display region (or a side display unit) located on a side surface of the main body. Meanwhile, the display unit 251 of the terminal disclosed herein may include both a second region 262 as a right-handed display region and a third region 263 as a left-handed display region, based on a first region 261 corresponding to the front surface of the display unit 251. By way of non-limiting example only, functions to be explained hereinafter may also be applied to a case where the second region 262 is the left-handed region and the third region 263 is the right-handed region.

Also, the display unit 252 disclosed herein is illustrated as having the display regions on both of the left and right side surfaces. However, the display unit 251 may further include a side display unit only on a left or right side of the first region 261 corresponding to the front surface of the display unit 251. However, for the sake of explanation, this specification exemplarily illustrates the display unit 251 having the display regions (or display units) on the front surface and the left and right side surfaces. Therefore, the present disclosure is also applicable to a terminal having a display region (or display unit) only on one of left and right side surfaces.

In addition, a reference numeral "261" denotes the front display unit (or the first region), and reference numerals "262" and "263" denote side display units (or the second region and the third region), respectively. Also, for explaining features or details which may equally be applied to all of the front and side display units, the term "display unit 252" is used instead of the reference numerals for indicating the front and side display units.

Figure 3:
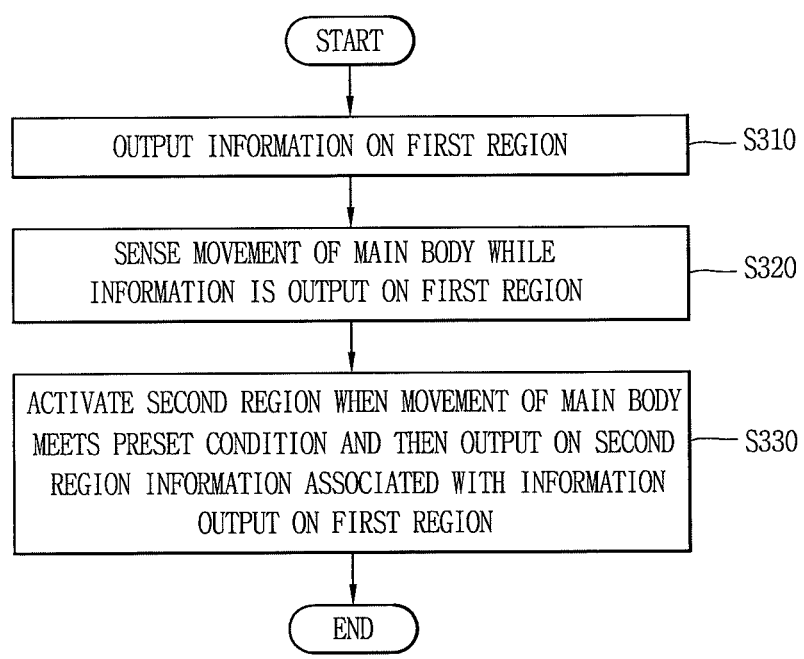
FIG. 3 is a flowchart representatively illustrating a control method in accordance with the present disclosure.
Figure 4A:
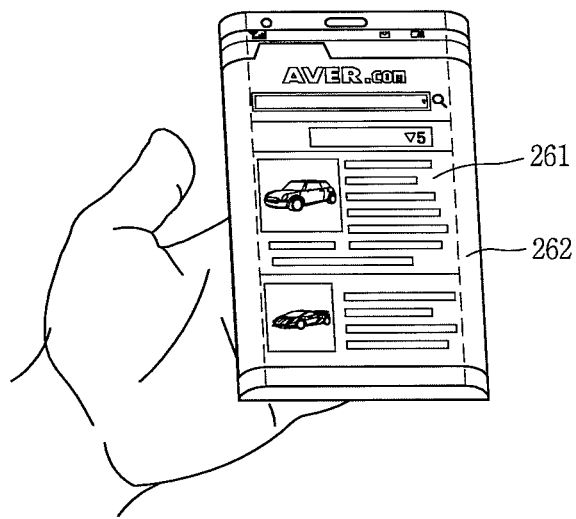
FIGS. 4(a) to 4(c) are conceptual views illustrating the control method illustrated in FIG. 3.
Figure 4B:
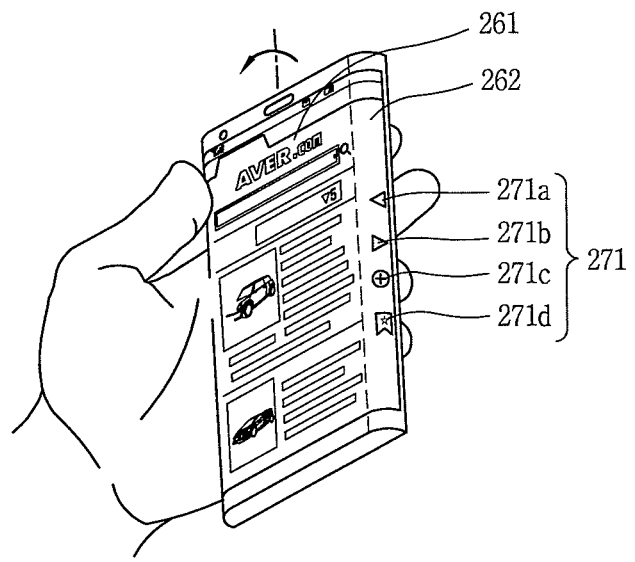
Figure 4C:
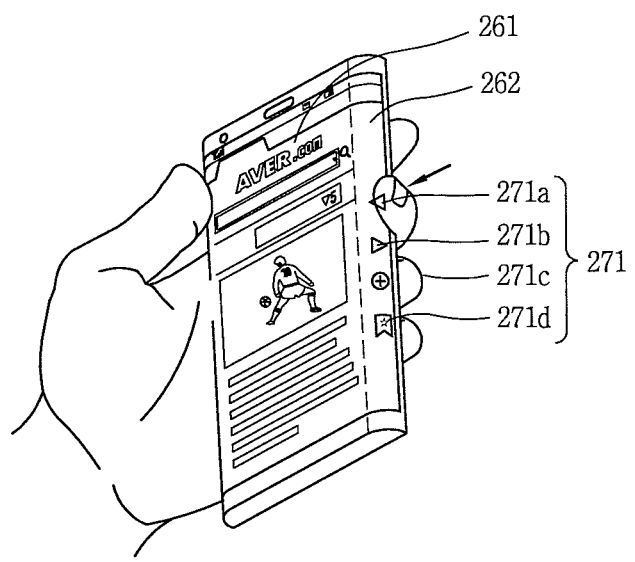

FIG. 3 is a flowchart representatively illustrating a control method in accordance with the present disclosure, and FIG. 4 is a conceptual view illustrating the control method illustrated in FIG. 3. As illustrated in FIG. 3, information (or screen information) is output on a first region (or a front display unit) 261 located on a front surface of a terminal main body (S310). Here, the information may be various types of information outputtable on the display unit 251 of the mobile terminal. An example of the information may be an execution screen of an application, a menu screen, a lock screen or a home screen page. The type of information output on the display unit 251 may be decided based on a user selection or under the control of the controller 180.

Meanwhile, the controller 180 senses a movement of the main body while the information is displayed on the first region (or the front display unit) 261, as illustrated in the outputting step (S310). In more detail, while the information is output on the first region 261, the sensing unit senses the movement of the main body (S320).

The movement sensed in the sensing step (S320) may be a preset input element which is associated with a function for inputting a control command to the terminal. That is, when the movement of the main body is sensed while the information is output on the first region 261, the controller 180 determines based on the sensed movement whether or not a placed state of the terminal corresponds to a specific state.

Here, the placed state of the terminal may be classified into a state (hereinafter, referred to as a first state) in which the main body is placed with the front or rear surface of the terminal facing a user, and a state (hereinafter, referred to as a second state) in which the main body is placed with the side surface of the terminal facing the user.

The sensing unit can sense tilting of the main body based on the user. Here, the sensing unit may be a motion sensor, an acceleration sensor, a camera, a touch sensor and the like. The motion sensor or the acceleration sensor directly senses a tilting (or rotating) movement of the terminal, but the camera or the touch sensor indirectly senses the movement of the terminal. For example, the camera may sense the movement of the terminal by use of changes in positions of an object to be captured.

The touch sensor can sense the movement of the terminal based on the change in a degree that a user's palm contacts the display unit. Here, the touch sensor senses a touch input applied to the display unit, and a preset condition includes a case where a touch area of the touch input applied to the display unit is more than a preset range. For example, the controller 180 terminates an output of information with respect to the second region using the change in the touch area of the touch input applied to the display unit while the second region is activated.

In more detail, when the user's hand touches a less area of the display unit due to the user gripping both side surfaces of the terminal with the hand, the controller 180 recognizes that the terminal is in the first state based on the less touch area. If the user tilts (or rotates) the terminal, the user grips the front and rear surfaces of the terminal with the hand. Here, the area that the user's hand touches the display unit increases more than that in the first state. The controller 180 thus recognizes that the terminal is in a third state based on the increase in the touch area.

The controller 180 decides the activation or deactivation of the second region 262 according to the determination result as to whether the placed state of the terminal corresponds to the specific state based on the sensed movement. That is, according to the determination result, when the movement of the main body allowing the side surface of the terminal to face the user is sensed, the controller 180 activates the second region 262. For example, while the second region 262 is deactivated, when the movement of the terminal body meets a preset condition, the second region 262 is activated and information, which is associated with information output on the first region 261, is output on the second region 262 (S330).

Here, the first region 261 may be switched from an activated state into a deactivated state. However, the present disclosure may not be limited to this. Alternatively, even when the second region 262 is activated in response to the movement of the main body meeting the preset condition, the first region 261 may remain activated.

The first region 261 (i.e., a display region corresponding to the first region) after the second region 262 is activated may be darker in brightness than that before the second region 262 is activated. For example, the controller 180 can control less power to be applied to the front display unit in the second state than in the first state.

In the outputting step (S330), the information associated with the information output on the first region 261 may include detailed information of the information output on the first region 261, link information and the like. As another example, the information associated with the information output on the first region 261 may include control information for controlling the information output on the first region 261. In more detail, the controller 180 can output on the second region 262 control information for controlling functions associated with the information output on the first region 261.

Also, the control information output on the second region 262 may include selectable graphic images. When at least one of the graphic images output on the second region 262 is selected, the controller 180 can execute a function associated with the selected graphic image, and output screen information related to the associated function on the first region 261. Here, the graphic image may include an execution icon of a specific function or a virtual key, for example. Also, the associated function may be the specific function or a function of executing a control command which is input by the virtual key. The screen information related to the associated function may be an execution screen of the specific function or a response screen with respect to the control command.

Hereinafter, description will be given of an example illustrating a graphic image, an associated function and screen information when the information associated with the information output on the first region 261 is control information, with reference to FIG. 4. FIG. 4 is a conceptual view illustrating one example of an operation realized according to the present disclosure.

As the step (S310) of outputting the information on the first region 261 which is located on the front surface of the terminal main body, referring to (a) of FIG. 4, a webpage may be output on the first region 261. Here, the second region 262 may be in a deactivated state. In this state, when the main body is tilted such that the side surface faces the user, the sensing unit senses the tilting and thus the terminal detects that the main body has been switched from the first state into the second state.

Referring to (b) of FIG. 4, the controller 180 can activate the second region 262 in response to the tilting, and output a control icon 271 (for example, a rewind icon (or key) 271a, a forward icon (or key) 271b, a new-window icon 271c, a bookmarking icon 271d, and the like) on the second region 262. Here, the information associated with the information output on the first region 261 may be image information which includes the control icon 271 and is output on the second region 262. The control information included in the associated information and the selectable graphic images may be the control icon.

Here, the output of the webpage in this example will be replaced with another example. For example, the webpage may be replaced with a home screen page for output. A control icon for controlling the home screen page may be output in response to a user's gesture (tilting gesture) of tilting the main body such that the side surface of the main body faces the user.

As another example, an execution screen of a music application or video play application may be output, and music play control icons (for example, fast forward, pause, rewind, etc.) or video play control icons may be output in response to the tilting gesture. The present disclosure, however, may not be limited to the output of such control information. In more detail, when the execution screen of the music application is output on the first region 261, information, such as a name of a singer, a genre, the number of playbacks, associated contents, a singer and the like, may be output on the second region 262 in response to the tilting gesture. This may also be applied to a book application. While a specific page of a book is output on the first region 261, additional information (for example, a title, a corresponding chapter, a name of an author, a genre, an associated page, etc.) related to the specific page (or book) may be output on the second region 262 in response to the tilting gesture.

When the tilting gesture is input while a specific content is reproduced, a time-based thumbnail of the corresponding content may be displayed on the second region 262. Also, when the content is paused or stopped, a recommended content or an associated content may be output on the second region 262 in the form of a thumbnail.

In the second state, the controller 180 can decide information to be output on the first region 261, in response to an additional control command. Here, the additional control command may be applied in various manners. For example, the additional control command may be applied by applying a touch input to the second region 262, or to the first region 261. In addition, the additional control command may be applied through a voice or through a physical key provided on the main body of the terminal.

For example, when a touch input is applied to the control icon 271 output on the second region 262 in the second state, the corresponding control command may be executed. In more detail, as illustrated in (c) of FIG. 4, when a touch input is applied to the rewind key 271a, the information output on the first region 261 may be switched into a previous page of the webpage. Here, the switching into the previous page may correspond to an execution of a function associated with the selected graphic image, and the screen information related to the associated function may be the previous page.

Here, even though the second state is maintained, the first region 261 may be reactivated and thus the previous page of the webpage may be output. As another example, even if a touch input is applied to the rewind key 271a, the first region 261 is in the deactivated state while the second state is maintained. Then, when the movement of the main body of the terminal (for example, the movement of switching from the second state into the first state) is sensed, the first region 261 may be activated and thus the previous page of the webpage may be output.

As another example, in the second state, the lighting of the first region 261 may become darker than that in the first state, and the previous page of the webpage may be output on the first region 261 which became dark. Here, in response to the movement of switching from the second state into the first state, the brightness of the lighting may be recovered to its original value. As an example of the additional control command applied through the voice, when a command (for example, "back to the previous page") corresponding to the rewind is input through the voice while the control icon 271 is output on the second region 271, the information output on the first region 261 may be switched into the previous page of the webpage.

The embodiment has illustrated the control method that the webpage is output on the first region 261 and the control icon of the webpage is output on the second region 262, but the control method may be implemented in various manners. For example, when the tilting gesture is input while an application is executed, a menu list within the application may be directly accessed so as to be output on the second region.

As another example, when an event, such as SMS, text, e-mail, music playback, or the like, is generated while the first region is used, information related to the event or a list of events may be output on the second region. As another example, while a captured image is output on the first region after the image is captured by a camera, when the tilting gesture is input, the captured image may be deleted or a list of captured images may be output on the second region. As another example, when the tilting gesture is input even while the first region is in the deactivated state, a notification for specific information or the like may be output on the second region.

As described above, according to the present disclosure, the controller may control the activation or deactivation of the side display unit using the movement of the terminal. Therefore, the present disclosure may provide the user which information which corresponds with the user's intent (desire).

Hereinafter, description will be given in more detail of exemplary embodiments of the control method, with reference to the accompanying drawings. A method of interlocking the front and side display units with the movement of the terminal may be implemented in various manners. Hence, in this specification, with explaining representative examples among other various embodiments, a method of controlling the front and side display units using the movement of the terminal will be described.

Figure 5A:
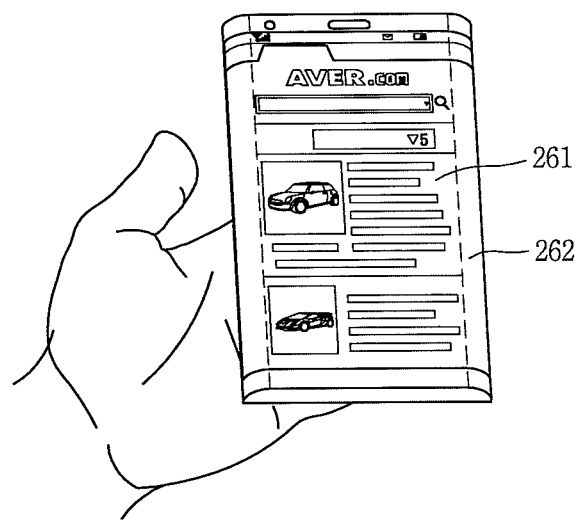
FIGS. 5(a) to 5(c) are conceptual views illustrating a method of controlling activation or deactivation of a side display unit according to a tilting direction.
Figure 5B:
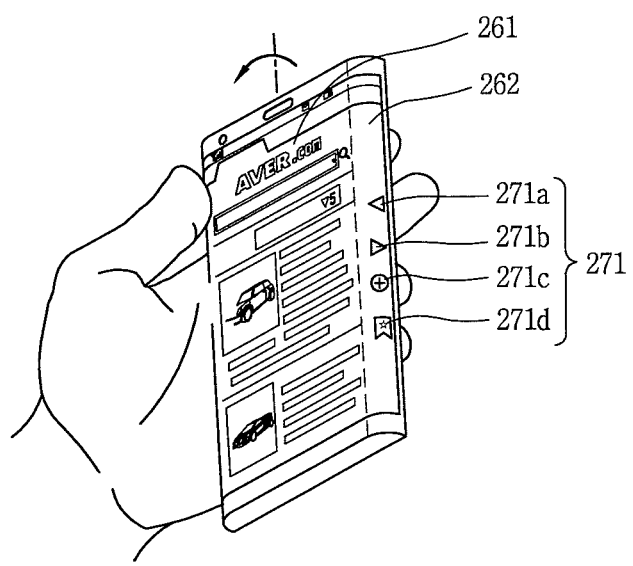
Figure 5C:
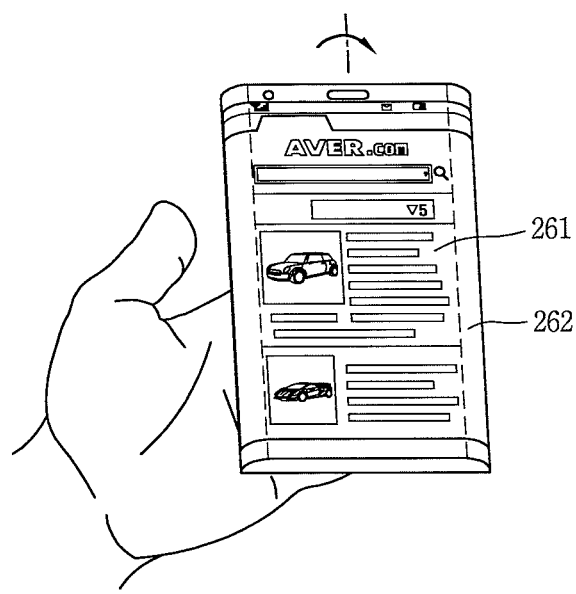

First of all, a method of processing a control command according to a tilting direction will be described in detail with reference to the accompanying drawing. FIG. 5 is a conceptual view illustrating a method of controlling an activation or deactivation of a side display unit according to a tilting direction.

As illustrated in (a) of FIG. 5, when a webpage is output on the first region 261 and the second region 262 is deactivated, and when a movement of the main body meeting a preset condition is sensed, the second region 262 is activated. For example, when the main body is tilted such that the side surface faces the user, the sensing unit can sense the tilting, and thus the controller 180 can activate the second region 262 in response to the tilting. On the activated second region 262 may be output a control icon 271 (for example, a rewind icon (or key) 271a, a forward icon (or key) 271b, a new-window icon 271c, a bookmarking icon 271d, and the like) for controlling the webpage.

Here, the control icon, as illustrated in the embodiment described with reference to FIG. 4, may receive an additional control command. Also, in this embodiment, in response to the additional control command, the same operation as illustrated in the embodiment of FIG. 4 (see FIGS. (b) and (c) of FIG. 4) may be executed. Here, the movement of the main body meeting the preset condition may be a movement of tilting the main body in a first direction. The first direction may be a direction that the terminal rotates to one side based on a central line of the main body. Here, the central line may be a virtual line which is on the center of the display unit and extends along a lengthwise direction of the terminal.

As illustrated in (c) of FIG. 5, while the second region 262 is activated due to the tilting of the main body in the first direction, when the main body is tilted in a second direction, opposite to the first direction, the controller 180 controls the second region 262 to be deactivated. That is, while the second state is maintained, the second region 262 may perform a function as a display unit which outputs graphic images and a function as a user input unit which receives a control command. When the second state is released, the second region 262 is deactivated and thus the functions as the display unit and the user input unit are released. Here, the information output on the first region 261, as illustrated, may be a webpage before the tilting in the first direction is performed. However, the present disclosure may not be limited to this, and the previous page may also be kept output.

By way of non-limiting example only, the information output on the activated second region may also be any visual information which is implemented in the form of an image like a GUI, text, icon and the like. In this embodiment, the activated second region 262 may be switched into the deactivated state after a lapse of a predetermined time or in response to an input of a specific control command. For example, the rear input unit 232 (or a user input unit, see FIG. 2B) may serve as an activation key for switching on or off the second region 262. That is, when the rear input unit 232 is pushed after the second region 262 has been activated in response to the tilting in the first direction, the controller 180 can deactivate the second region 262.

In addition, as illustrated in (c) of FIG. 5, as the main body is tilted in the second direction which is opposite to the first direction, the second region 262 is deactivated. In cooperation with the deactivation of the second region 262, brightness of the first region 261 may increase. For example, when the first state is switched into the second state, the brightness of the first region 261 may decrease. Then, when the second state is switched back into the first state, the first region 261 may be recovered to its original brightness.

Figure 6A:
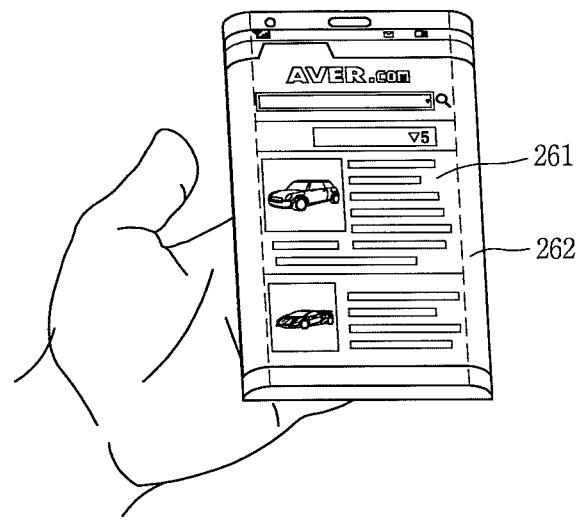
FIGS. 6A(a) to 6B(c) are conceptual views illustrating a method of controlling an activation or deactivation of a side display unit according to a user's relative position.
Figure 6A:
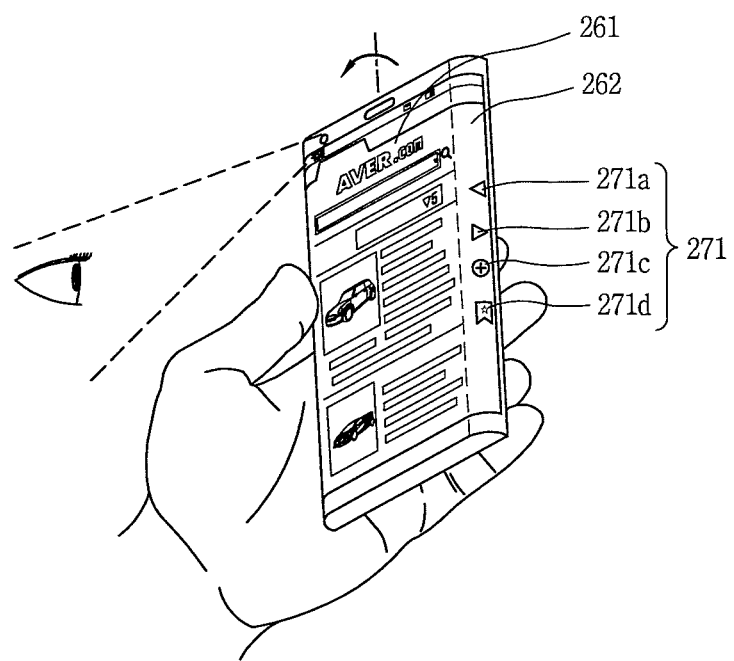
Figure 6A:
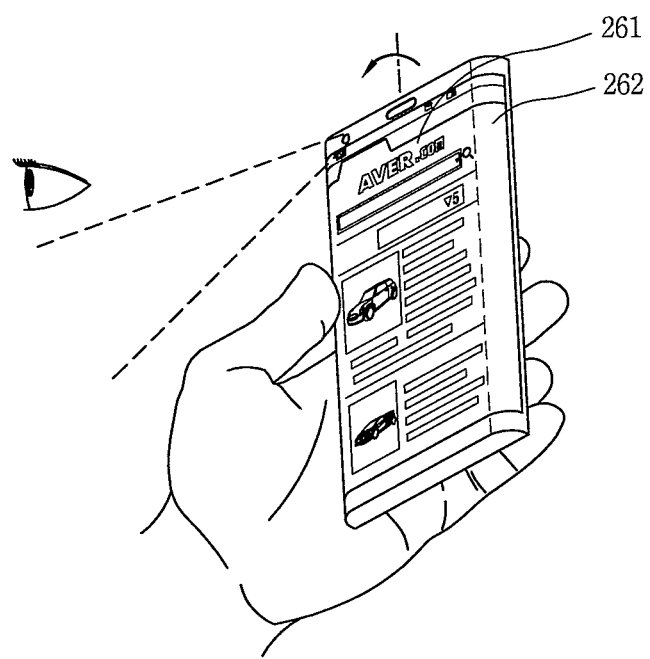
Figure 6B:
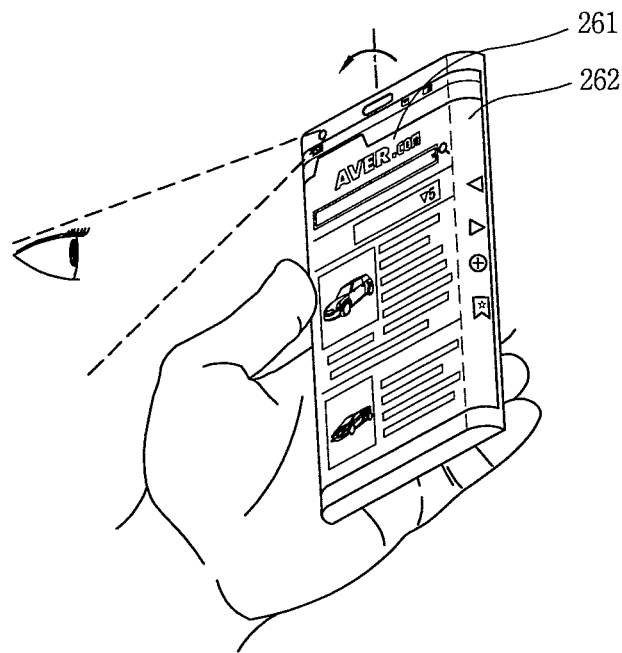
Figure 6B:
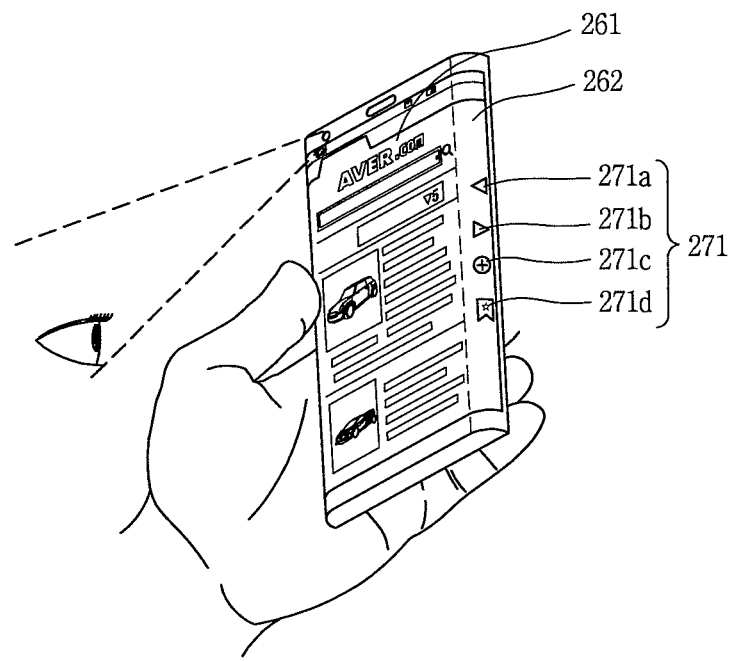
Figure 6B:
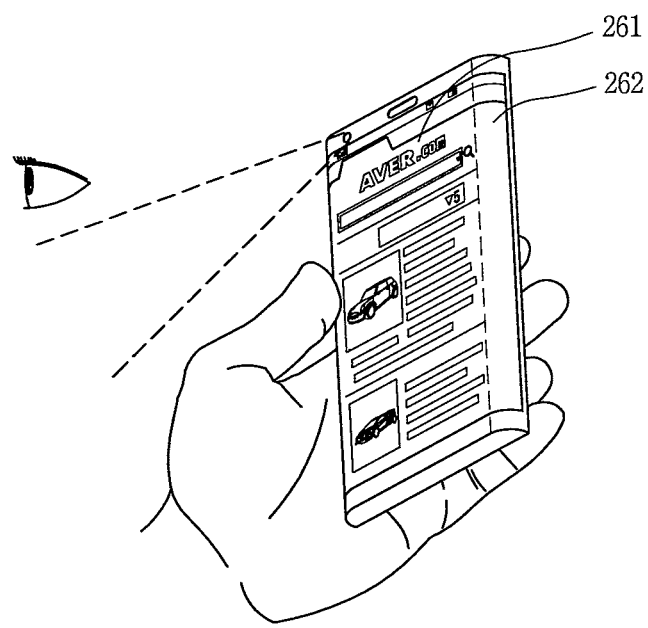

Hereinafter, a method of processing a control command according to a relative position of a user with respect to the terminal will be described in detail with reference to the accompanying drawings. FIGS. 6A and 6B are conceptual views illustrating a method of controlling an activation or deactivation of a side display unit according to a user's relative position.

As illustrated in FIGS. 6A and 6B, the controller 180 can determine a relative position of the user with respect to the main body. When the movement of the main body meets a preset condition, the controller 180 can decide the activation or deactivation of the second region 262 according to the determination result. Thus, the sensing unit can sense information for determining relative positions of a reference portion of the user and a part of the terminal (for example, the front display unit or the side display unit).

Here, the sensing unit may include a ultrasonic sensor, a camera, an infrared sensor, a ultraviolet sensor and the like. The reference portion of the user may be the user's head or eyes. In a more detailed example, the terminal may sense the relative positions in real time through head tracking, eye tracking, motion sensing and the like. Regarding the eye tracking, for example, the controller 180 of the terminal calculates a position of an object (user's eyes) and a direction that the object faces in real time, and changes the activation or deactivation of the second region 262 in real time based on the position of the object or the facing direction.

In a more detailed example, when the information output on the first region 261 is a webpage, the associated information is control information and the graphic image is a control icon will be explained along with FIG. 6A. First, as illustrated in (a) of FIG. 6A, the webpage may be output on the first region 261. Here, the second region 262 may be in the deactivated state.

Under this state, when the main body is tilted such that the side surface faces the user, the sensing unit senses the tilting and the controller thus detects that the main body has been switched from the first state into the second state. Also, the controller determines the relative positions of the user's reference portion and the terminal. As illustrated, the second region 262 is activated only when the movement of the main body meets the preset condition according to the determination result even though the sensing unit senses the tilting.

For example, the present condition may be a case where the user faces the side display unit or seems to face the side display unit. In more detail, when it is determined that the user's eyes are located within a range that the user can view the second region 262 according to the sensed relative positions, as illustrated in (b) of FIG. 6A, the controller 180 can activate the second region 262, in response to the tilting, and output the control icon 271 for controlling the webpage on the second region 262. Under this state, the user can input an additional control command. Here, the additional control command, as described with reference to FIG. 4, may be applied in various manners, such as a touch input, a voice input, a push input and the like.

Here, when the user's eyes are determined to be located within a range of being incapable of viewing the second region 262 according to the sensing of the relative positions, as illustrated in (c) of FIG. 6A, the controller 180 controls the display unit to maintain the deactivated state of the second region 262 even if the tilting is sensed. In such a manner, when the deactivation is maintained, the controller 180 can process a touch input, a voice input and a push input as wrong inputs when such inputs are received.

As another example, referring to FIG. 6B, the user's relative position is monitored while the second region 262 is activated. The controller 180 controls the second region 262 according to the monitoring result. In a more detailed example, a case where the information output on the first region 261 is a webpage, the associated information is control information and the graphic image is a control icon will be explained along with FIG. 6B.

First, the webpage may be output on the first region 261. Here, the second region 262 may be in the deactivated state (see (a) of FIG. 6A). Under this state, when the main body is tilted such that the side surface faces the user, the sensing unit senses the tilting and the controller 180 detects that the main body has been switched from the first state into the second state. Also, as illustrated in (a) of FIG. 6B, the controller 180 activates the second region 262 in response to the tilting, and outputs the control icon 271 on the second region 262.

The controller 180 monitors relative positions between the main body and the user through a camera while the second region 262 is in the activated state. According to the monitoring result, when the second region 262 located on the side surface of the main body is out of the range of the user's eyes, the second region 262 is deactivated.

When the second region 262 is activated, the camera is cooperatively activated to capture the user. The controller 180 determines the relative positions between the main body and the user based on the captured image, and maintains the activated state of the second region 262 only when a preset condition is met. For example, as illustrated in (b) of FIG. 6B, the controller 180 monitors in real time a position of an object (user's eyes) and a direction that the object faces in an eye tracking manner. According to the monitoring result, when the user's eyes face another portion other than the second region 262 (namely, the second region 262 located on the side surface of the main body is out of the range of the user's eyes), the controller 180 detects it and deactivates the second region 262 (see (c) of FIG. 6B). Here, the preset condition may be a case where the user's eyes are determined to face the second region 262.

In the activated state of the second region 262, when the user's eyes which have faced another portion, other than the second region 262, faces the second region 262 again, the controller 180 can calculate it and reactivate the second region 262.

Figure 7A:
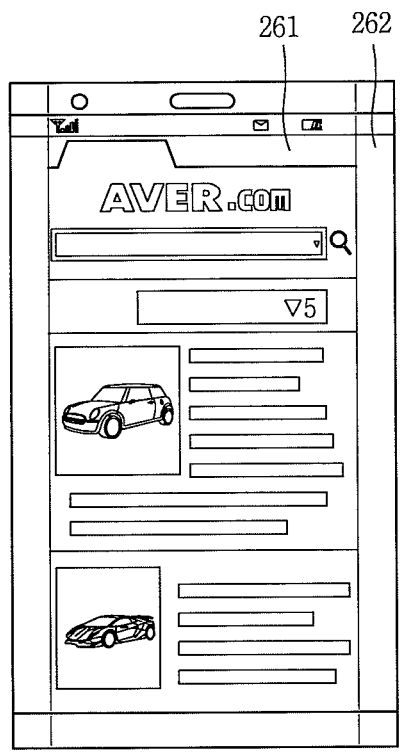
FIGS. 7A(a) to 7C(c) are conceptual views illustrating a method of displaying event information on a second region.
Figure 7A:
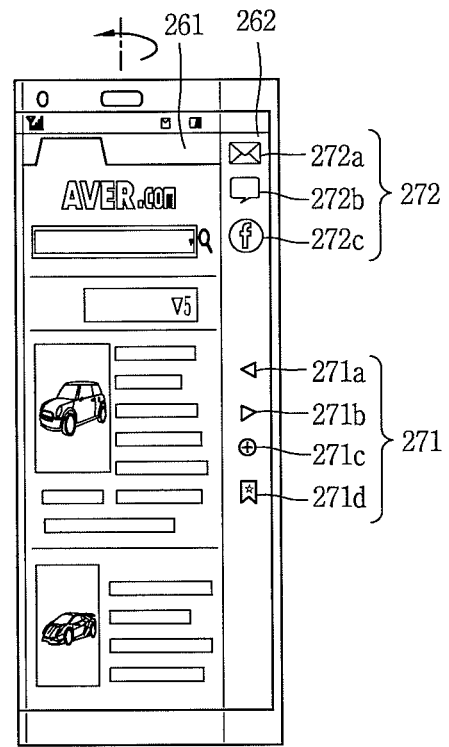
Figure 7C:
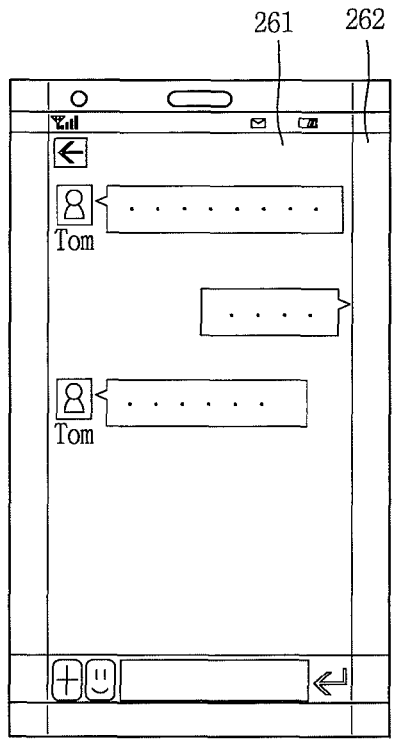
Figure 7C:
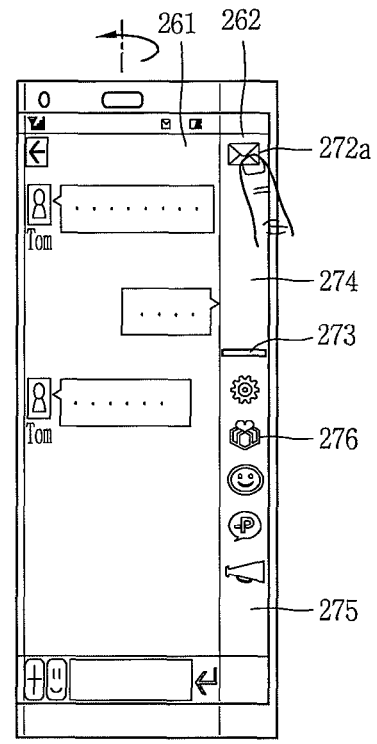
Figure 7C:
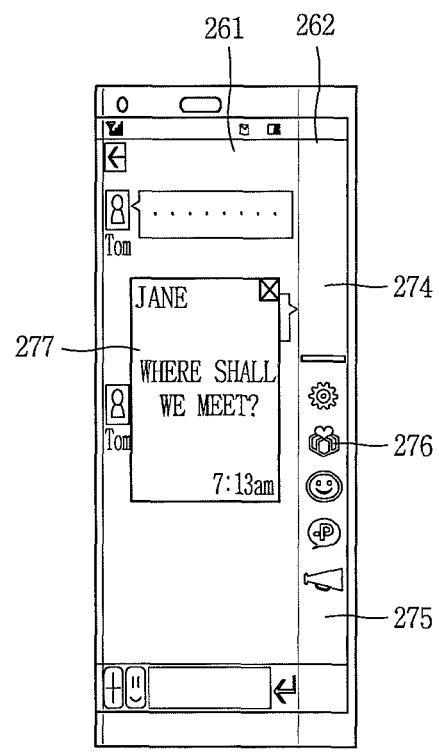

Hereinafter, another example of information output in response to the activation of the second region will be described in detail with reference to the accompanying drawings. FIGS. 7A to 7C are conceptual views illustrating a method of displaying event information on the second region. As illustrated in FIGS. 7A to 7C, in a state where unchecked event information is present, when the main body moves to satisfy a preset condition, the controller 180 further outputs the unchecked event information.

The unchecked event information, as illustrated in FIG. 7A, may be output on an arbitrary position within the second region 262. In more detail, as illustrated in (a) of FIG. 7A, a webpage may be output on the first region 261. Here, the second region 262 may be in the deactivated state.

Under this state, when the main body is tilted such that the side surface faces the user, the sensing unit senses the tilting and the terminal thus detects that the main body has been switched from the first state into the second state. As illustrated in (b) of FIG. 7A, the controller 180 can activate the second region 262 in response to the tilting, and output the control icon 271 for controlling the webpage on the second region 262.

Here, an event may be generated in the terminal in the state where the webpage is output on the first region 261 or in a previous state. Examples of the event generated in the mobile terminal include a call signal reception, a message reception, a data reception, a reception of information related to a specific application, and the like. The generated event may be an event which remains unchecked until the user tilts the main body.

As illustrated in (b) of FIG. 7A, when the main body is switched from the first state into the second state, the controller 180 outputs a notification icon 272 notifying the unchecked event on the second region 262 along with the control icon 271. As illustrated in (c) of FIG. 7A, the notification icon 272 may be output adjacent to one end of the second region 262.

Here, the notification icon 272 may be arranged in the order of generation of events, and disappear when the user completely checks the event. In more detail, in the order of generation of events in an application, first to third notification icons 272a, 272b and 272c notifying the event generation are output.

Here, each notification icon may be an icon representing a category. For example, the first notification icon 272a may be an icon corresponding to a category associated with a message reception, the second notification icon 272b may be an icon corresponding to a category associated with a schedule management, and the third notification icon 272c may be an icon corresponding to a category associated with an application update.

As another example, the unchecked event information, as illustrated in FIG. 7B, may be output on a specific portion within the second region 262. In more detail, the second region 262 may be divided into at least two regions. Information associated with the information output on the first region 261 may be output on one of the at least two divided regions of the second region 262 and the unchecked event information may be output on the other region.

For example, as illustrated in (a) of FIG. 7B, an execution screen of a specific application (for example, a messenger application) may be output on the first region 261. Here, the second region 262 may be in the deactivated state. Under this state, when the main body is tilted such that the side surface faces the user, the sensing unit senses the tilting and the terminal thus detects that the main body has been switched from the first state into the second state. As illustrated in (b) of FIG. 7B, the controller 180 activates the second region 262 in response to the tilting. Here, the second region 262 is divided into a plurality of regions by a boundary line 273. The unchecked event information (for example, the notification icon 272a of the message reception) is output on an upper region 274, and menu icons 276 are output on a lower region 275 as information associated with the information output on the first region 261. Here, the menu icons 276 may be icons (an address book, chatting, etc.) controlling functions of the specific application.

As another example, as illustrated in FIG. 7C, when a preset touch input is applied to the region on which the unchecked event information is output of the second region, detailed information 277 related to the unchecked event information may be output one of the first region 261 and the second region 262.

Here, the region on which the unchecked event information is output may be implemented as a graphic image which is selectable by a touch input. In addition, (a) and (b) of FIG. 7C are the same example as (a) and (b) of FIG. 7B. Referring to (c) of FIG. 7C, when a touch input is applied to the lower region, the controller 180, as illustrated in (d) of FIG. 7C, outputs the event-related information on the first region 261. However, the present disclosure may not be limited to this, but be applicable even to an example that a touch input is applied to the notification icon other than the region.

In this example, when a touch input is applied by the user to the upper region, the controller 180 outputs detailed information related to the event on the first region 261. The detailed information may be at least part of a message, and be output in the form of a preview. Also, the detailed information may be output on the second region 262, other than on the first region 261. As another example, the detailed information may be output on both of the first region 261 and the second region 262.

In addition, when the detailed information is output on the second region 262, the detailed information is output in a scrollable state. For example, the detailed information may be output on the second region 262 in the scrolling manner. The scrolling may be displayed with moving information related to another terminal from top to bottom or bottom to top of a screen. As another example, when the user applies a drag input to the second region 262, the detailed information may be scrolled along the dragging direction.

The output detailed information may disappear in response to an input of an additional control command. For example, a recover icon for receiving a control command for making the detailed information disappear may be output on the first or second region 261 or 262, and the detailed information may not be output any more in response to a touch input applied to the recover icon. As another example, the controller 180 can release the output of the detailed information when touch inputs (for example, tapping) which are consecutively applied to the second region 262 with a time interval are sensed.

Figure 8A:
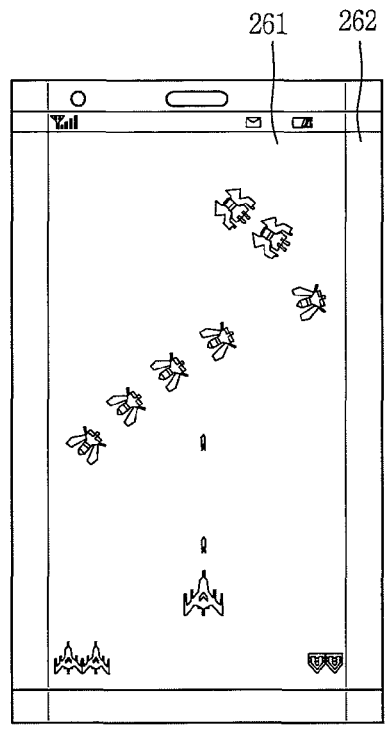
FIGS. 8(a) to 8(c) are conceptual views illustrating a method of displaying preset information on a second region.
Figure 8B:
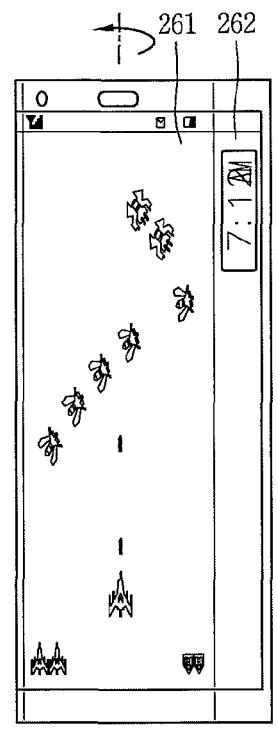
Figure 8C:
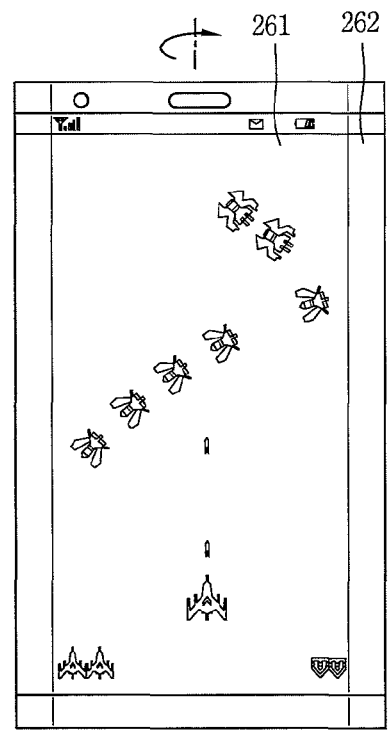

Hereinafter, another example of information output in response to the activation of the second region will be described in detail with reference to the accompanying drawing. FIG. 8 is a conceptual view illustrating a method of displaying preset information on the second region.

As illustrated in FIG. 8, specific information may further be output, in addition to the information associated with the information output on the first region 261, on the second region 262 which is activated in response to the tilting of the main body. Here, the specific information may be always output along with the information associated with the information output on the first region 261.

Also, the specific information may be information which corresponds to a function set by the user. In such a manner, the specific information corresponding to the function, for example, may be schedule information such as a calendar, a clock and the like, image information such as a photo and the like, record information such as a memo and the like, etc.

In more detail, referring to (a) of FIG. 8, information, for example, an execution screen of a game application, is output on the first region 261. In this state, as illustrated in (b) of FIG. 8, when the sensing unit senses the tilting of the main body (or the user's tilting gesture), a digital clock is output on the second region 262. Accordingly, the user can check time information using the tilting, while fully using the first region 261 as the execution screen of the game application.

That is, while the first region 261 is fully used to output an execution screen of a specific application, another information may be output using the second region 262. As another example, for a video play application, while a video is output on a full screen, another information, such as an event notification, may be output on the second region 262. Here, information associated with the execution screen of the game application may be output along with the digital clock. For example, a menu icon of the game application may be output along with the digital clock. The menu icon may include a pause or stop key of the game, and the pause or stop may be performed by applying a touch input. However, the present disclosure may not be limited to this. The digital clock may also individually be output.

Referring to (c) of FIG. 8, when the main body is tilted in an opposite direction of the tilting so as to be switched back into the first state, the digital clock may disappear. Here, the menu icon may be continuously output on the second region 262.

Figure 9A:
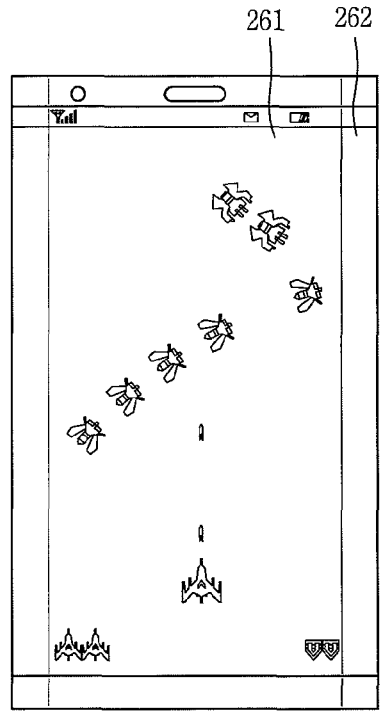
FIGS. 9(a) to 9(c) are conceptual views illustrating a method of controlling a second region and a third region.
Figure 9B:
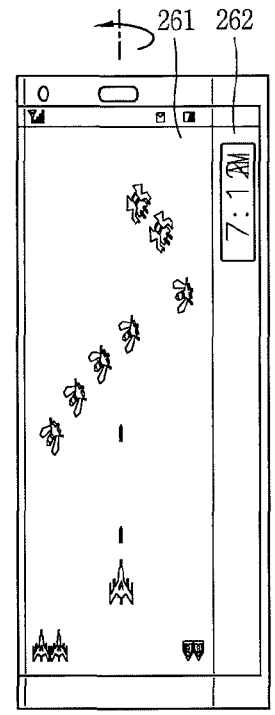
Figure 9C:
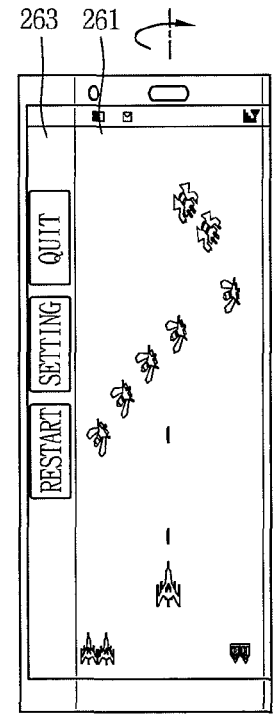

Hereinafter, a method of controlling both the second region and a third region, which is located on the opposite side surface of the second region, will be described in detail with reference to the accompanying drawing. FIG. 9 is a conceptual view illustrating a method of controlling the second region and a third region.

As illustrated in FIG. 9, while the second region 262 and a third region 263 are deactivated, when the movement of the main body meets a preset condition, the controller 180 activates one of the second region 262 and the third region 263. Here, the movement of the main body meeting the preset condition may be a movement that the main body is tilted in a first direction or in a second direction which is opposite to the first direction.

As illustrated in (a) of FIG. 9, information, for example, an execution screen of a game application, is output on the first region 261. In this state, as illustrated in (b) of FIG. 9, when the sensing unit senses the tilting of the main body in the first direction, the second region 262 is activated. Further, as illustrated in (c) of FIG. 9, when the main body is tilted in the second direction, the third region 263 is activated. In such a manner, a region to be activated may be selectable according to the tilting direction of the main body.

Here, information associated with the information output on the first region 261 or preset specific information may be output on the activated region. For example, the control information which is output on the activated second region 262 may depend on the information output on the first region 261. the preset control information may be output on the third region 263, independent of the information output on the first region 261.

For example, referring to (b) of FIG. 9, the digital clock may be output on the second region 262. Referring to (c) of FIG. 9, menu icons of the game application may be output on the third region 263. As another example, schedule information such as a calendar, a clock and the like, image information such as a photo and the like, and record information such as a memo and the like may be output on the third region 263.

As another example, an execution screen of an operator function may be output on the third region 263. A list of applications which have been recently open may be output as history information on the execution screen in sequence, and each item of the list may be deleted by a user's touch input. According to the control method, a tilting gesture in one direction may be used as a scenario of a currently-executed application, and a tilting gesture in another direction may be used to access a recently-executed application list or a preset application.

As another example, the third region 263 may be divided into a plurality of regions by a boundary line. Thus, the digital clock may be output on one region of the third region 263 and the execution screen of the operator function may be output on the other region of the third region 263. That is, a plurality of information, which are independent of the information output on the first region 261, may be output by dividing a display region.

Figure 10A:
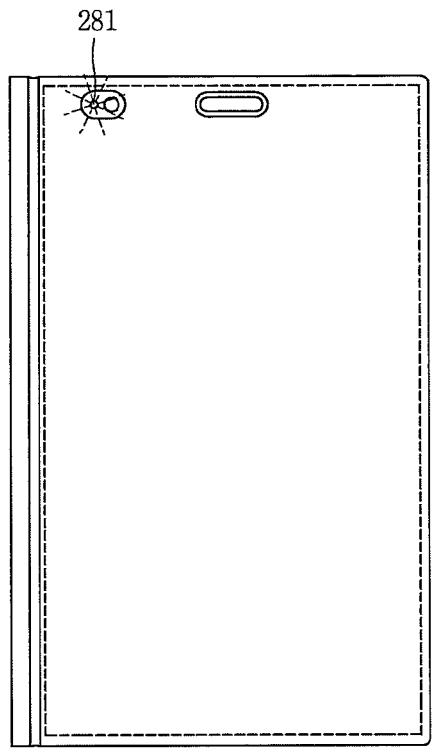
FIGS. 10(a) to 10(c) are conceptual views illustrating a method of controlling a second region in cooperation with a cover.
Figure 10B:
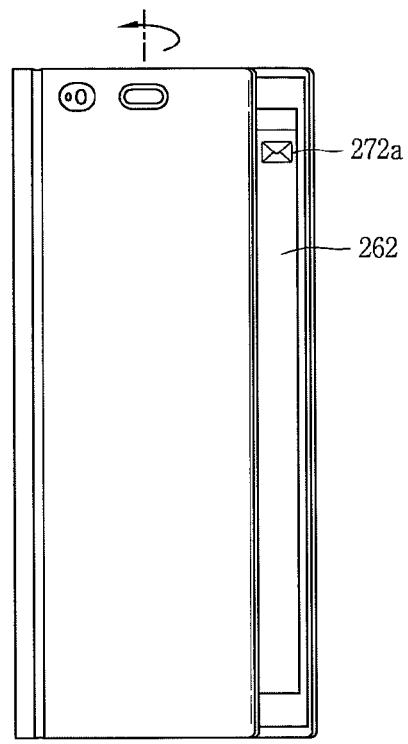
Figure 10C:
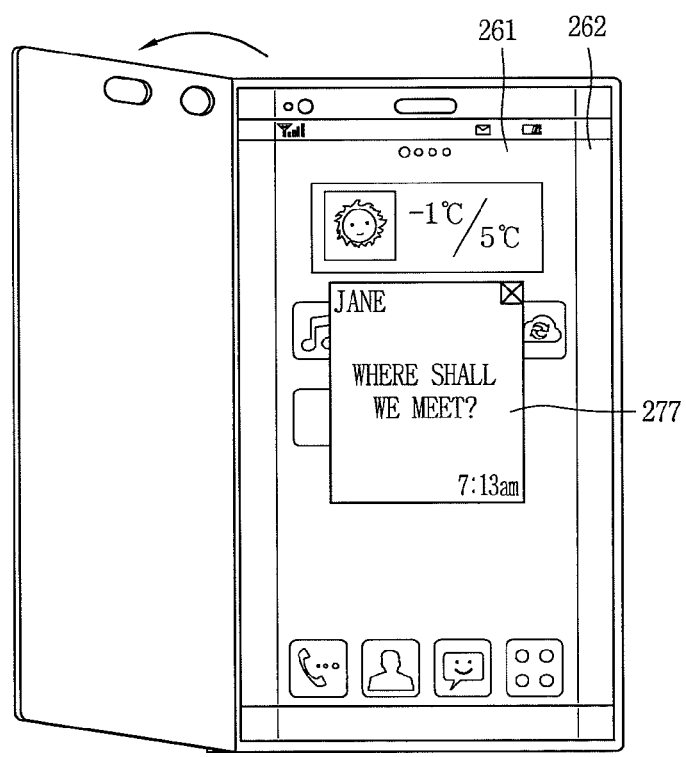

Hereinafter, a method of controlling the second region when the display unit is obscured by a cover will be described in detail with reference to the accompanying drawing. FIG. 10 is a conceptual view illustrating a method of controlling the second region in cooperation (or by interlocking) with a cover.

As illustrated in FIG. 10, the second region 262 may be used in a closed state that the terminal is covered with a separate cover (pouch, case, etc.) and an open state. The determination of the closed state and the open state may be performed by a combination of at least one of a proximity sensor, an illumination sensor, a gyro sensor and a hall sensor which are provided in the terminal.

For example, as illustrated in (a) of FIG. 10, when the front display unit of the terminal is covered with a cover and the first region 261 is deactivated, when an event is generated, a lighting unit 281 of the terminal is activated and emits a notification light to a portion corresponding to an indicator window of the cover. However, the present disclosure may not be limited to this. The notification light may be output on the first region 261 and externally exposed through a front window of the cover.

In such a manner, when the cover obscures the first region 261 in the first state, if the main body is tilted in the second state while the cover still covers the first region 261, the controller 180 activates the second region 262. As illustrated in (b) of FIG. 10, a notification icon 272a indicating the generation of the event is output on the activated second region 262. Afterwards, when the cover is switched into the open state, detailed information 277 related to the event generated is output on the first region 261 or the second region 262 (see (c) of FIG. 10).

As another example, the detailed information 277 related to the generated event may also be output on the second region 262 when a touch input is applied to the notification icon 272a. In addition, the detailed information may be updated by an input of an additional control command. In more detail, information related to news, weather and the like may be output on the second region 262, and such information may be updated to the latest information every time when the second region 262 is tapped.

Figure 11A:
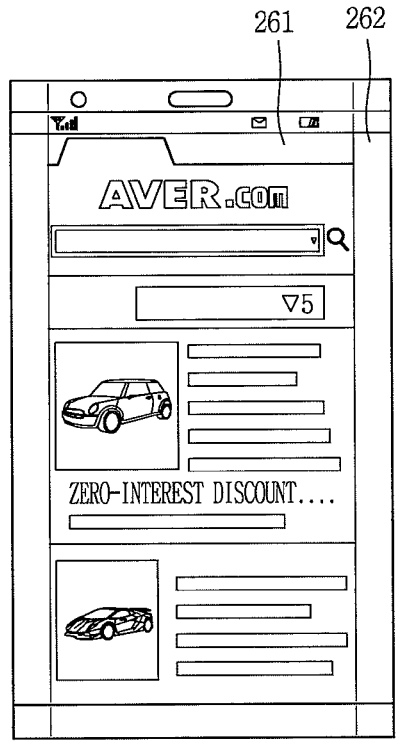
FIGS. 11(a) to 11(c) are conceptual views illustrating a method of sharing information on a first region and a second region.
Figure 11B:
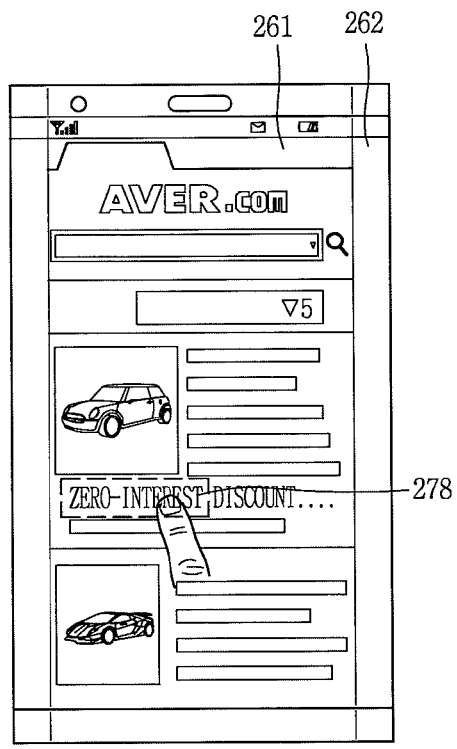
Figure 11C:
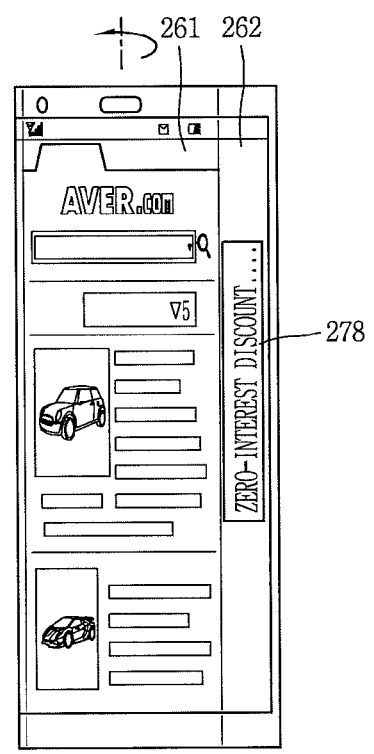

Hereinafter, a method of sharing information on the first region and the second region will be described in detail with reference to the accompanying drawing. FIG. 11 is a conceptual view illustrating a method of sharing information on a first region and a second region. As illustrated in (a) of FIG. 11, a webpage may be output on the display unit 251 of the mobile terminal. The webpage may include at least one text information. Under this state, when the main body of the terminal is tilted, as illustrated in (c) of FIG. 11, the text information may be output on the second region 262.

The webpage and the text information are merely illustrative, and may be replaced with a graphic user interface (GUI) of a currently-executed application and information included in the GUI, respectively. Here, the text information to be output on the second region 262 may be designated by a user. That is, as illustrated in (b) of FIG. 11, after specific information 278 (for example, the text information within the webpage) is selected by applying a touch input to the first region 261, when the main body of the terminal is tilted, the selected specific information 278 is output on the second region 262, as illustrated in (c) of FIG. 11. As such, even though the selected specific information 278 is output on the second region 262, the webpage which was output on the first region 261 may be continuously output with maintaining its layout.

According to the operation, the user can share information, which the user has recognized through the first region 261, with another user through the second region 262. In such a manner, the present disclosure controls an operation or non-operation of the side display unit according to the movement (or the placed state) of the terminal, so as to provide the user with information which corresponds with the user's intent. Also, the cooperation of the front and side display units may allow for providing a new type of user convenience. Also, the present disclosure provides a terminal consuming less power by distinguishing an activation or non-activation of the front and side display units.

Figure 12:
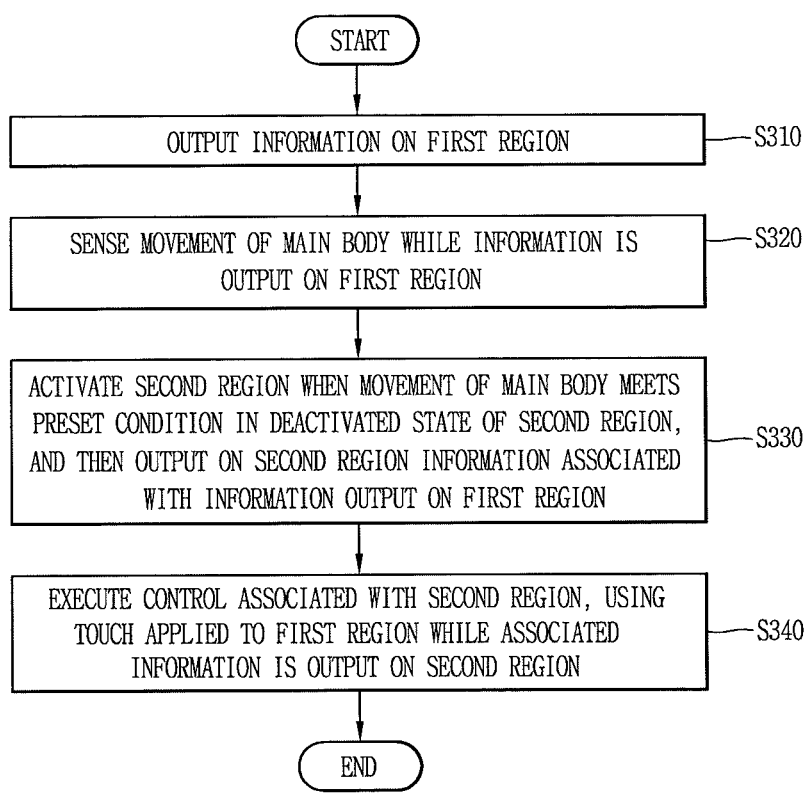
FIG. 12 is a flowchart representatively illustrating a control method in accordance with the present disclosure.
Figure 13A:
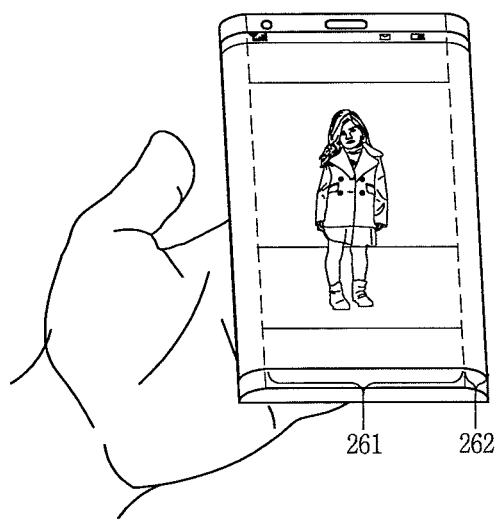
FIGS. 13A(a) to 13B(b) are conceptual views illustrating the control method illustrated in FIG. 12.
Figure 13A:
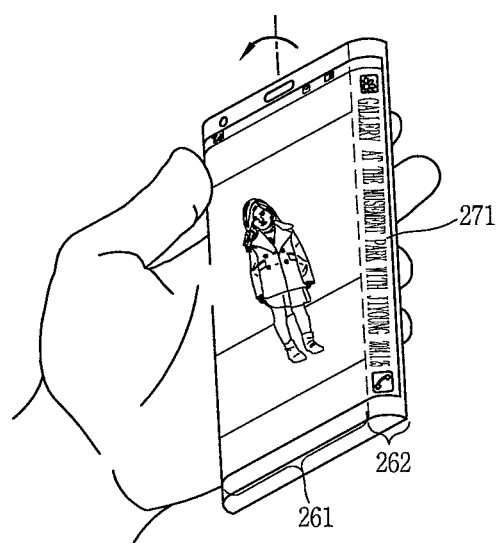
Figure 13B:
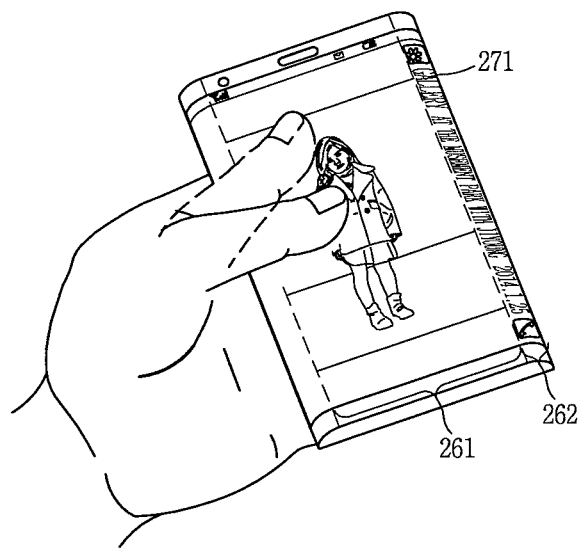
Figure 13B:
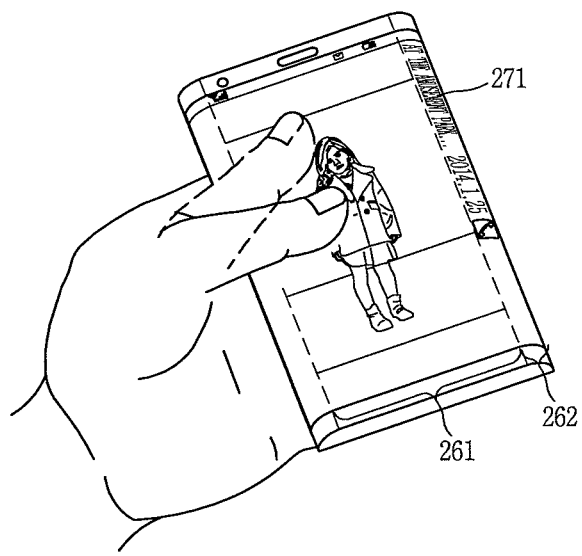

FIG. 12 is a flowchart representatively illustrating a control method in accordance with the present disclosure, and FIGS. 13A and 13B are conceptual views illustrating the control method illustrated in FIG. 12. As illustrated in FIG. 12, information (or screen information) is output on the first region (or the front display unit) 261 located on the front surface of the terminal main body (S310). Here, the information may be various types of information outputtable on the display unit 251 of the mobile terminal. The example of the information may be an execution screen of an application, a menu screen, a lock screen or a home screen page. The type of information output on the display unit 251 may be decided based on a user selection or under the control of the controller 180 (see FIG. 1A).

Meanwhile, the controller 180 senses a movement of the main body while the information is displayed on the first region (or the front display unit) 261, as illustrated in the outputting step (S310). In more detail, while the information is output on the first region 261, the sensing unit senses the movement of the main body (S320).

The movement sensed in the sensing step (S320) may be a preset input element which is associated with a function for inputting a control command to the terminal. That is, although not illustrated, when the movement of the main body is sensed while the information is output on the first region 261, the controller 180 determines based on the sensed movement whether or not a placed state of the terminal corresponds to a specific state.

Here, the placed state of the terminal may be divided into a state (hereinafter, referred to as a first state) in which the main body is placed with the front or rear surface of the terminal facing a user, and a state (hereinafter, referred to as a second state) in which the main body is placed with the side surface of the terminal facing the user.

The sensing unit can sense tilting of the main body based on the user. Here, the sensing unit may be a motion sensor, an acceleration sensor, a camera, a touch sensor and the like. The motion sensor or the acceleration sensor directly senses a tilting (or rotating) movement of the terminal, but the camera or the touch sensor indirectly senses the movement of the terminal. For example, the camera may sense the movement of the terminal by use of changes in positions of an object to be captured.

The touch sensor can sense the movement of the terminal based on the change in a degree that the user's palm contacts the display unit. Here, the touch sensor senses a touch input applied to the display unit, and a preset condition includes a case where a touch area of the touch input applied to the display unit is more than a preset range. For example, the controller 180 terminates an output of information with respect to the second region using the change in the touch area of the touch input applied to the display unit while the second region is activated.

In more detail, when the user's hand touches a less area of the display unit due to the user gripping both side surfaces of the terminal with the hand, the controller 180 recognizes that the terminal is in the first state based on the less touch area. If the user tilts (or rotates) the terminal, the user grips the front and rear surfaces of the terminal with the hand. Here, the area that the user's hand touches the display unit increases more than that in the first state. The controller 180 thus recognizes that the terminal is in a third state based on the increase in the touch area.

The controller 180 decides the activation or deactivation of the second region 262 according to the determination result as to whether the placed state of the terminal corresponds to a specific state based on the sensed movement. That is, according to the determination result, when the movement of the main body that the side surface of the terminal faces the user is sensed, the controller 180 activates the second region 262. For example, while the second region 262 is deactivated, when the movement of the terminal body meets a preset condition, the second region 262 is activated and information associated with information output on the first region 261 is output on the second region 262 (S330).

Here, the first region 261 may be switched from an activated state into a deactivated state. However, the present disclosure may not be limited to this. Alternatively, even when the second region 262 is activated in response to the movement of the main body meeting the preset condition, the first region 261 may remain activated.

The first region 261 after the second region 262 is activated may be darker in brightness than that before the second region 262 is activated. For example, the controller 180 can control less power to be applied to the front display unit in the second state than in the first state.

In the outputting step (S330), the information associated with the information, which is output on the first region 261, may include detailed information related to the information output on the first region 261, link information and the like.

As another example, the information associated with the information output on the first region 261 may include control information for controlling the information output on the first region 261. In more detail, the controller 180 can output on the second region 262 control information for controlling functions associated with the information output on the first region 261.

Also, the control information output on the second region 262 may include selectable graphic images. When at least one of the graphic images output on the second region 262 is selected, the controller 180 can execute a function associated with the selected graphic image, and output screen information related to the associated function on the first region 261. Here, the graphic image may include an execution icon of a specific function or a virtual key, for example. Also, the associated function may be the specific function or an execution function of a control command which is input by the virtual key. The screen information related to the associated function may be an execution screen of the specific function or a response screen with respect to the control command.

Finally, while the associated information is output on the second region 262, the controller 180 performs a control with respect to the second region 262 by using a touch applied to the first region 261. As an example, the controller 180 can change at least a part of the associated information output on the second region 262, in response to a touch applied to the first region 261. In more detail, scrolling of the information output on the second region 262, an output of an execution screen by a selection of a graphic image output on the second region 262, a movement of an image output on the second region 262 and the like may be performed by the touch input applied to the first region 261.

Hereinafter, description will be given of an example that when the information output on the second region 262 is additional information related to the information output on the first region 261, the additional information is controlled by a touch applied to the first region 261, with reference to FIGS. 13A and 13B. FIGS. 13A and 13B are conceptual views illustrating the control method illustrated in FIG. 12.

As the step (S310) of outputting the information on the first region 261 located on the front surface of the terminal main body, as illustrated in (a) of FIG. 13A, an image (or a photo) may be output on the first region 261. Here, the second region 262 may be in the deactivated state.

In this state, when the main body is tilted such that the side surface faces the user, the sensing unit senses the tilting and thus the terminal detects that the terminal main body has been switched from the first state into the second state. As illustrated in (b) of FIG. 13A, the controller 180 can activate the second region 262 in response to the tilting of the main body, and output additional information related to the image, for example, a memo 271 input to the image.

In the second state, the controller 180 controls the information output on the second region 262 in response to an additional control command applied to the first region 261. For example, the controller 180 performs a scroll function for the associated information in response to the touch applied to the first region 261. In more detail, as illustrated in (a) and (b) of FIG. 13B, the additional information output on the second region 262 may be scrolled in response to a touch input, for example, a drag touch or a flick touch, applied to the first region 261. An example of scrolling the memo 271 associated with the image is illustrated in FIG. 13B.

Here, when the drag touch is applied to the first region 261 while the associated information is output on the second region 262, the associated information may be scrolled as long as a touch length of the drag touch. Therefore, in this example, the memo 271 is scrolled by the touch length of the drag touch applied to the first region 261.

As described above, according to the present disclosure, the controller 180 controls whether or not to operate the side display unit according to the movement (or the placed state) of the terminal, and additionally controls the side display unit according to a touch input applied to the front display unit. Therefore, the user can be provided with information to correspond with the user's intent, and be facilitated to manipulate the display units of the terminal.

Hereinafter, description will be given in more detail of exemplary embodiments of the control method, with reference to the accompanying drawings. A method of interlocking the front and side display units with the movement of the terminal may be implemented in various manners. Hence, in this specification, with explaining representative examples among other various embodiments, a method of controlling the front and side display units using the movement of the terminal will be described.

Figure 14A:
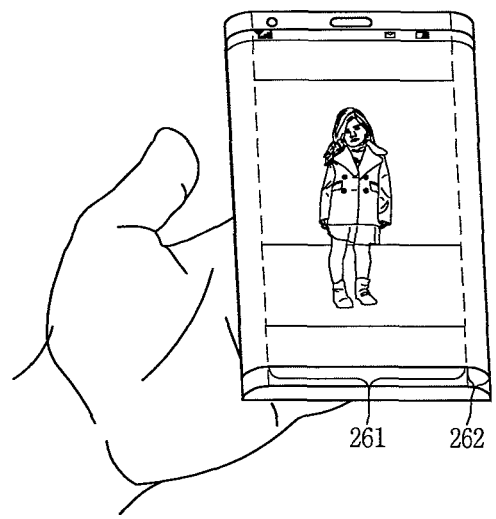
FIGS. 14(a) to 14(c) are conceptual views illustrating a method of controlling an activation or deactivation of a side display unit according to a tilting direction.
Figure 14B:
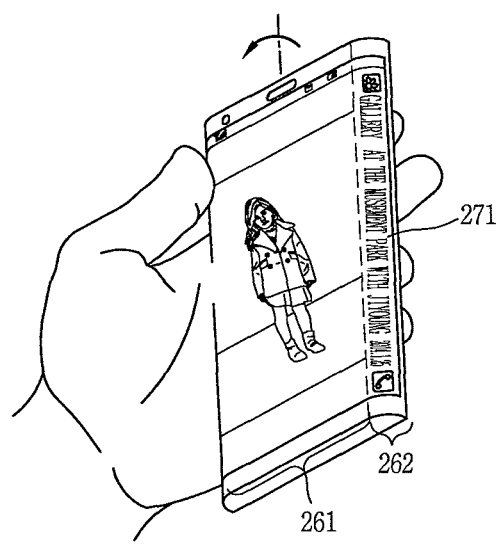
Figure 14C:
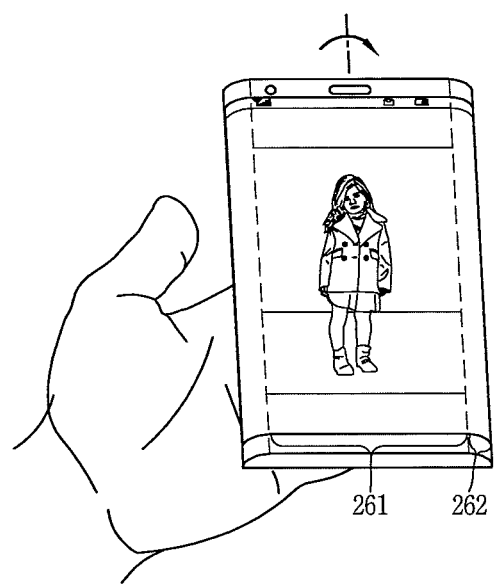

First of all, a method of processing a control command according to a tilting direction will be described in detail with reference to the accompanying drawing. FIG. 14 is a conceptual view illustrating a method of controlling an activation or deactivation of a side display unit according to a tilting direction. As illustrated in (a) of FIG. 14, when an image is output on the first region 261 and the second region 262 is deactivated, and when a movement of the main body which meets a preset condition is sensed, the second region 262 is activated. For example, when the main body is tilted such that the side surface faces the user, the sensing unit can sense the tilting, and the controller 180 can activate the second region 262 in response to the tilting. On the activated second region 262 may be output additional information (for example, the memo 271) related to the image.

Here, an additional control command with respect to the additional information may be executed in response to a touch input applied to the first region 261, similar to the embodiment described with reference to FIG. 4. Also, even in this example, the same operation as the embodiment illustrated in FIG. 13B may be executed. Here, the movement of the main body meeting the preset condition may be a movement of tilting the main body in a first direction. The first direction may be a direction that the terminal rotates to one side based on a central line of the main body. Here, the central line may be a virtual line which is on the center of the display unit and extends along a lengthwise direction of the terminal.

As illustrated in (c) of FIG. 14, while the second region 262 is activated in response to the tilting of the main body in the first direction, when the main body which has been tilted in the first direction is tilted in a second direction, opposite to the first direction, the controller 180 controls the second region 262 to be deactivated. Here, information output on the first region 261, as illustrated, may be an image, which has been output before the tilting in the first direction is applied. However, the present disclosure may not be limited to this, and a previous image which has been stored just before the image may also be output.

Here, when the touch input is applied to the first region 261 in the state the main body has moved due to being tilted in the first direction, the controller 180 processes the touch input applied to the first region 261 as a control command with respect to the second region 262. Also, in the tilted state in the first direction, when the main body is tilted in the second direction, opposite to the first direction, the controller 180 can process the touch input applied to the first region 261 as a control command with respect to the first region 261. By way of non-limiting example only, the information output on the activated second region 262 may be any visual information which is implemented in the forms of an image like a GUI, text, icon and the like.

In this embodiment, the activated second region 262 may also be switched into the deactivated state after a lapse of a predetermined time or in response to an input of a specific control command. For example, the rear input unit 232 (or a user input unit, see FIG. 2B) may serve as an activation key for switching on or off the second region 262. That is, when the rear input unit 232 is pushed after the second region 262 has been activated in response to the tilting in the first direction, the controller 180 can deactivate the second region 262.

In addition, as illustrated in (c) of FIG. 14, as the main body is tilted in the second direction which is opposite to the first direction, the second region 262 is deactivated. In cooperation with the deactivation of the second region 262, brightness of the first region 261 may increase. For example, when the first state is switched into the second state, the brightness of the first region 261 may decrease. Then, when the second state is switched back into the first state, the first region 261 may be recovered to its original brightness.

Hereinafter, examples of information output on the second region as the information associated with the information output on the first region will be described in detail with reference to the accompanying drawings. In particular, FIGS. 15A to 15F are conceptual views illustrating information output on a side display unit.

Figure 15A:
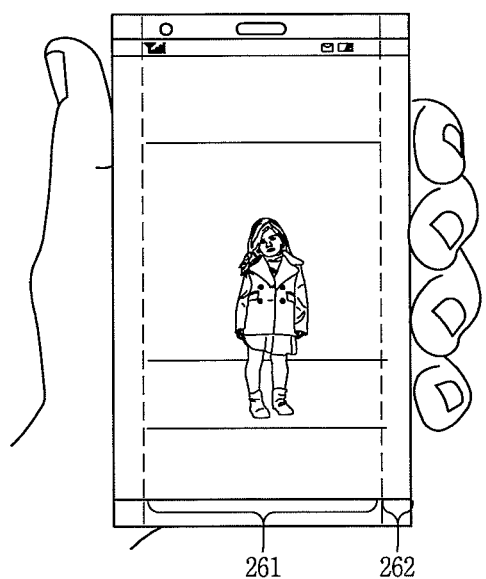
FIGS. 15A(a) to 15F(b) are conceptual views illustrating information output on a side display unit.
Figure 15A:
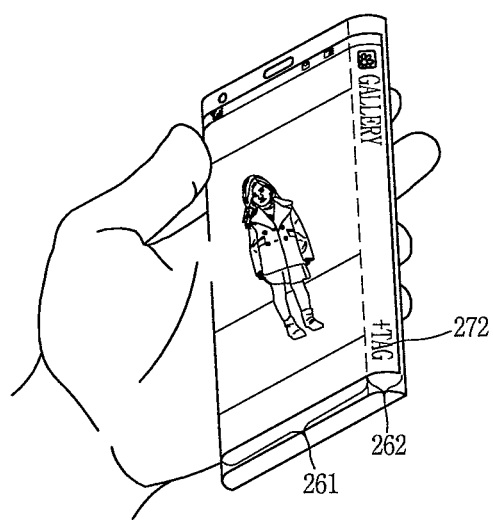

As illustrated in FIG. 15A, an image (or a photo) may be output on the first region 261. A function icon 272 (or a control icon controlling the image) by which a function associated with the image is selected may be output in response to a user's gesture (tilting gesture) of tilting the main body such that the side surface faces the user. An example of the function icon 272 illustrated in the drawing is an icon which is output to execute a tagging function.

In the second state, the controller 180 can decide an execution of a tagging function, in response to the additional control command. Here, the additional control command may be applied in various manners. For example, the additional control command may be applied by applying a touch input to the function icon 272 or applying a touch input to the first region 261. In addition, the additional control command may be applied through a voice or through a physical key provided on the main body of the terminal.

Figure 15B:
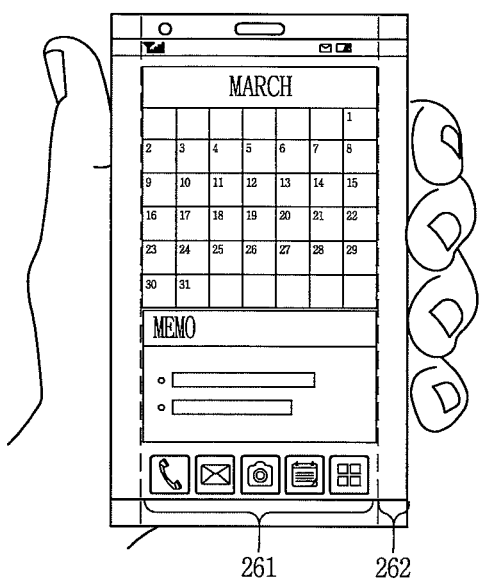
Figure 15B:
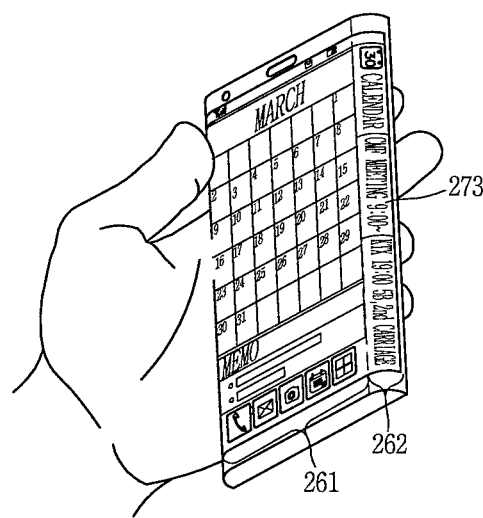

As illustrated in FIG. 15B, an execution screen of a specific application may be output, and information which is preset to be output in response to a tilting gesture may be output on the second region 262. As one example, when a calendar or an execution screen of a schedule application is output, and when the tilting gesture is applied, detailed information 273 (schedule information) related to a schedule which meets a preset condition may be output on the second region 272. The preset condition may be a preset number of recent schedules, a schedule for today and the like, for example.

Figure 15C:
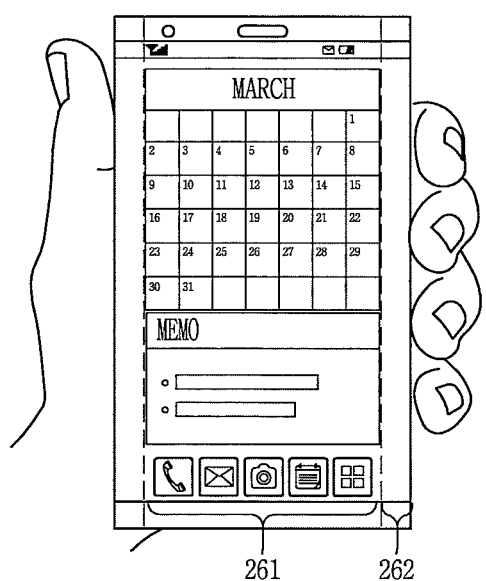
Figure 15C:
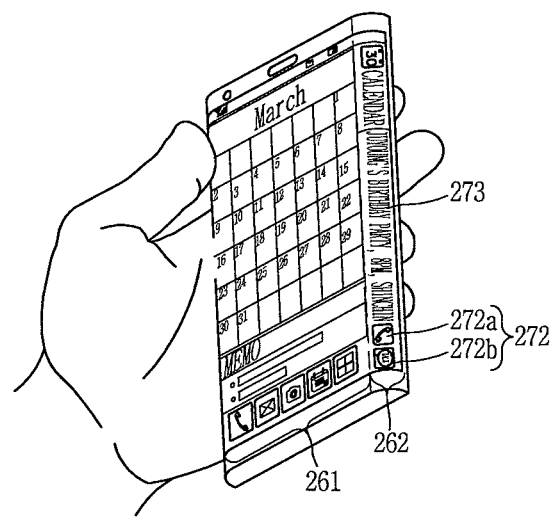
Figure 15D:
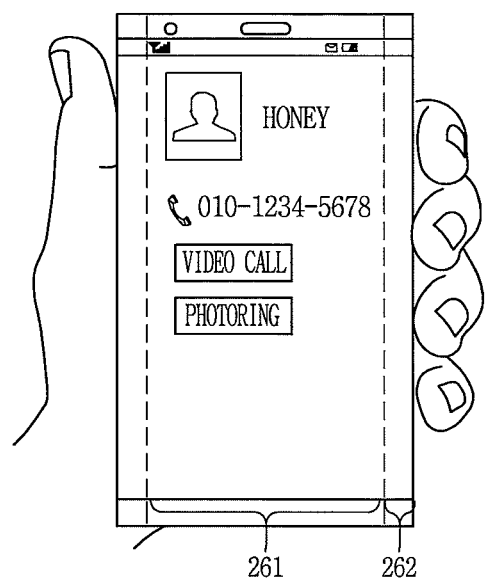
Figure 15D:
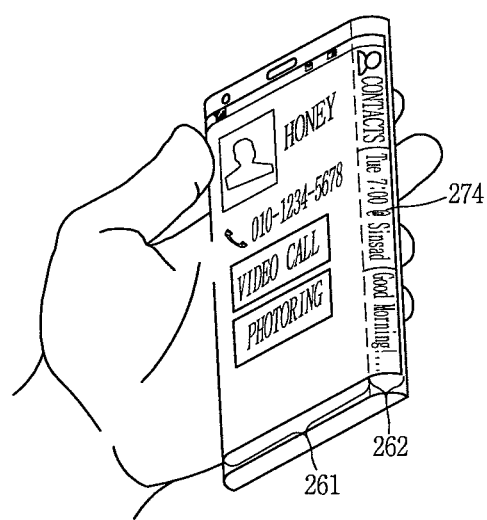

As another example, referring to FIG. 15C, in the state that the calendar or the execution screen of the schedule application is output, when the tilting gesture is applied, a function icon 272 may be output on the second region 262 along with the detailed information 273 related to the schedule which meets the preset condition. Here, the function icon 272 may be an icon for executing a function associated with the detailed information 273.

In more detail, when the detailed information 273 includes information related to a person, for example, a name or a phone number (or a contact number), the function icon 272 may be an icon for attempting a call connection to the contact number associated with the name. As another example, the function icon 272 may be an icon for transmitting a message to contact information of a messenger application or an icon for opening a chatting window.

Here, in the second state, the controller 180 can decide an execution of a function associated with the function icon 272, in response to an additional control command. The additional control command may be applied in various ways. For example, the additional control command may be applied through a touch with respect to the function icon 272, or a touch with respect to the first region 261. In addition, the additional control command may be applied through a voice or through a physical key provided on the main body of the terminal.

In this embodiment, when a touch input is applied to an icon 272a attempting a call connection, a signal for the call connection may be transmitted to the contact number of the name included in the detailed information 273, and an execution screen associated with the call connection may be output on the first region 261.

As another example, when a touch input is applied to an icon 272b opening a chatting window, a messenger application associated with the chatting window may be executed and the chatting window for chatting with the person included in the detailed information 273 may be output. As another example, referring to FIG. 15D, while the information related to the person, for example, the name or the phone number, is output on the first region 261, when the tilting gesture is applied, event information 274 which has been generated in association with the person may be output on the second region 272. Examples of the event information may include a message reception, a call signal reception, a missed call, an alarm, a schedule alarm, an e-mail reception, an information reception through an application and the like. Also, the event information may include schedule information such as a calendar, a clock and the like, image information such as a photo and the like, record information such as a memo and the like, etc.

As another example, when an execution screen of an application which mutually communicates with the person, for example, an execution screen of a call-related application is output on the first region 261, and when the tilting gesture is applied, event information 274 which has been generated in association with the person may be output on the second region 262.

Here, the event information 274 may include schedule information related to the person, transmitted and received messages with the person, and the like. In more detail, when the tilting gesture is applied while the call connected to the person is ongoing, the event information generated in association with the person may be output on the second region 262, and the user can check those event information during the call connected.

Figure 15E:
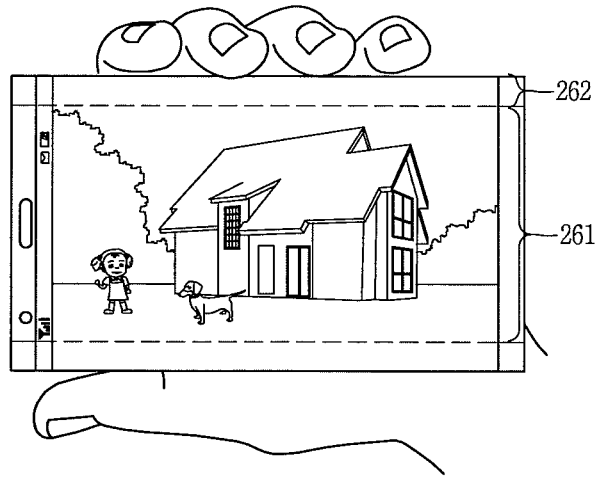
Figure 15E:
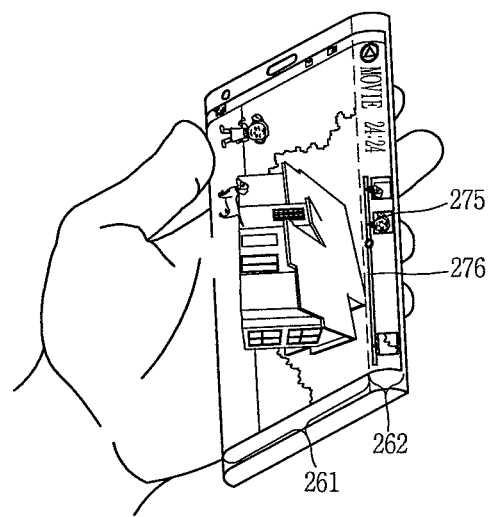

As another example, referring to FIG. 15E, an execution screen of a music application or video play application may be output, and music play control icons (for example, fast forward, pause, rewind, etc.) or video play control icons may be output on the second region 262 in response to the tilting gesture. In addition, when the tilting gesture is applied while a specific content is reproduced, a time-based thumbnail of the corresponding content may be displayed on the second region 262. Also, when the content is paused or stopped, a recommended content or associated content may be output on the second region 262 in the form of a thumbnail. In addition, when the tilting gesture is applied while the specific content is reproduced, a progress bar 276 indicating the degree of the reproduction may be output on the second region 262.

As another example, information, such as a name of a singer, a genre, the number of playbacks, associated contents, a singer and the like, may be output on the second region 262 in response to the tilting gesture. This may also be applied to a book application. While a specific page of a book is output on the first region 261, additional information (for example, a title, a corresponding chapter, a name of an author, a genre, an associated page, etc.) related to the specific page (or book) may be output on the second region 262 in response to the tilting gesture.

Figure 15F:
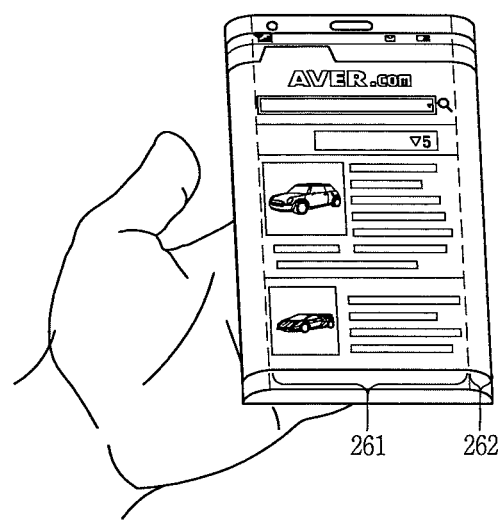
Figure 15F:
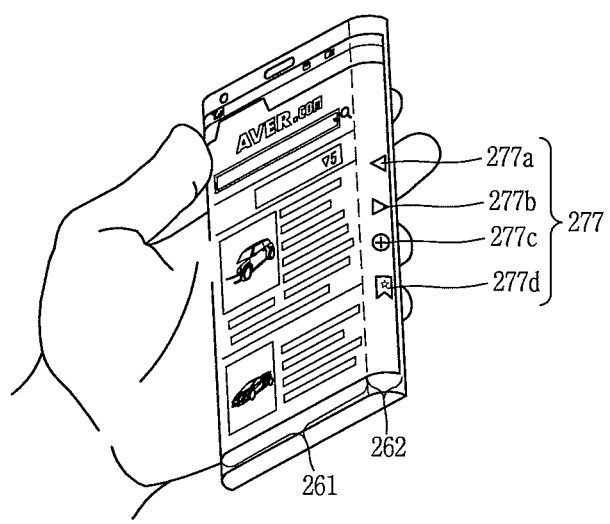

To output on the second region control information, such as the control icon, the thumbnail 275 and the progress bar 276, which are provided to control specific information output on the first region 261, may be varied into various forms. Referring to FIG. 15F, while a webpage is output on the first region 261, when the tilting gesture is output, control information for controlling the webpage may be output on the second region 262.

For example, as illustrated in (a) of FIG. 15F, the webpage may be output on the first region 261. Here, the second region 262 may be in the deactivated state. Under this state, when the main body is tilted such that the side surface faces the user, the sensing unit senses the tilting and thus the terminal detects that the main body has been switched from the first state into the second state. As illustrated in (b) of FIG. 15F, the controller 180 can activate the second region 262 in response to the tilting, and output a control icon 277 (for example, a rewind key 277a, a forward key 277b, a new window icon 277c, a bookmarking icon 277d, etc.) for controlling the webpage on the second region 262.

Here, in this embodiment, the output of the webpage may be replaced with another example. For example, the webpage may be replaced with a home screen page, and a control icon for controlling the home screen page may be output in response to a user gesture (tilting gesture) for tilting the main body such that the side surface faces the user.

In the second state, the controller 180 can decide information to be output on the first region 261, in response to an additional control command. Here, the additional control command may be applied in various ways. For example, the additional control command may be applied through a touch with respect to the second region 262, or a touch with respect to the first region 261. In addition, the additional control command may be applied through a voice or through a physical key provided on the main body of the terminal.

As one example, the control icon 277 which is output on the second region 262 may be selected by a touch input applied to the first region 261 in the second state. That is, the first region 261 and the second region 262 may interlock with each other in the second state. Hereinafter, examples thereof will be described in more detail with reference to the accompanying drawings.

FIGS. 16A, 16B, 17A and 17B are conceptual views illustrating an operating method of a first region and a second region in a mutually-cooperative manner. As illustrated in these drawings, the controller 180 can output control information for controlling a function associated with information output on the first region 261, on the second region 262. The control information output on the second region 262 may include selectable graphic images. One of the graphic images may be selected by a touch applied to the first region 261. When at least one of the graphic images output on the second region 262 is selected, the controller 180 executes a function associated with the selected graphic image, and outputs screen information related to the associated function on the first region 261. This example illustrates that the graphic image is the control icon 277.

Figure 16A:
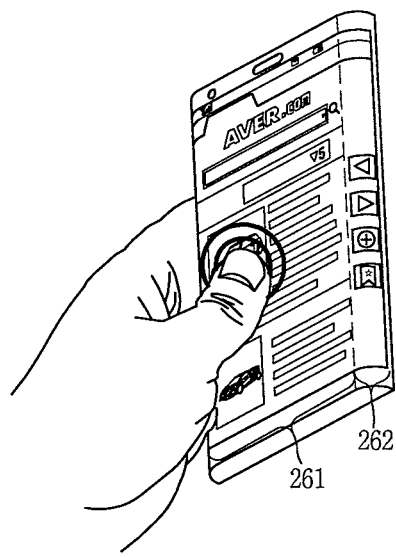
FIGS. 16A(a) to 17B(b) are conceptual views illustrating an operating method of a first region and a second region in a mutually-cooperative manner.
Figure 16A:
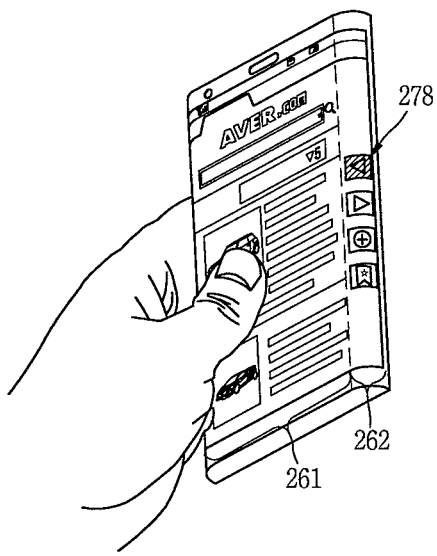
Figure 16A:
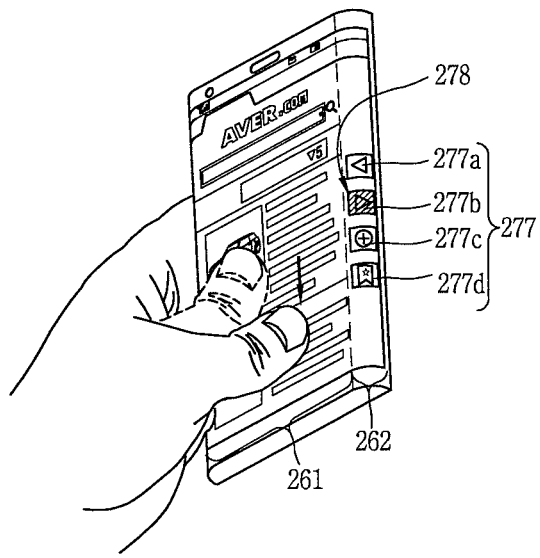

First, as illustrated in (a) of FIG. 16A, according to the control method illustrated in FIG. 15F, the webpage is output on the first region 261 and the control icon 277 is output on the second region 262 in the second state. Under this state, when a touch input is applied to the first region 261, the touch input may be an input for controlling the control icon 277. As one example, referring to (b) of FIG. 16A, when a long touch or a tap touch is applied to the first region 261, one icon 277a of the control icon 277 is selected. Here, the selected icon 277a may be highlighted to help the user's recognition. As an example of the highlighting, when a first touch is applied to the first region 261, a guide image 278 may be output on one of the graphic images included in the second region 262. As aforementioned, the first touch may be the long touch or the tap touch. The tap touch may be a touch which is maintained for more than a preset time, or a double tap touch.

As illustrated in (c) of FIG. 16A, when another touch input which is consecutive to the touch input applied to the first region 261 is applied, the controller 180 processes the touch input as a command for the control icon 277. For example, while the guide image 278 is displayed, when a second touch dragged in one direction is applied consecutive to the first touch input to the first region 261, the guide image 278 is moved from one to another graphic image.

Here, the graphic images are arranged on the second region along a lengthwise direction of the main body. The controller 180 moves the guide image 278 which has been output on the one graphic object to another graphic object along the direction that the second touch is applied. In more detail, after the one icon 277a of the control icon 277 is selected by the long touch or the tap touch, when a drag touch or a flick touch is applied to the first region 261, the selection of the one icon 277a is released and another icon 277b of the control icon is selected. It can be noticed, as illustrated, that the highlighted icon is moved down by a downward drag touch.

Figure 16B:
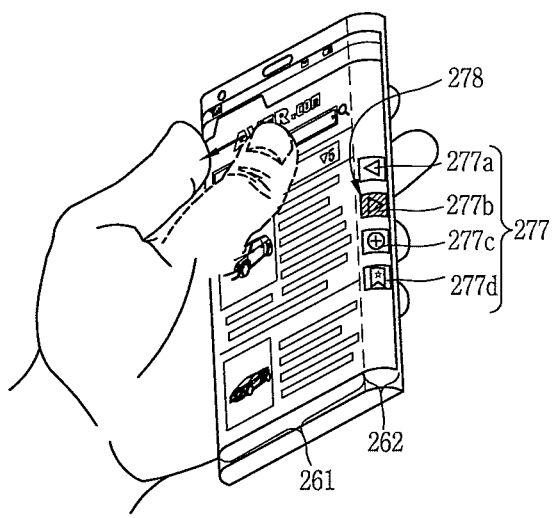
Figure 16B:
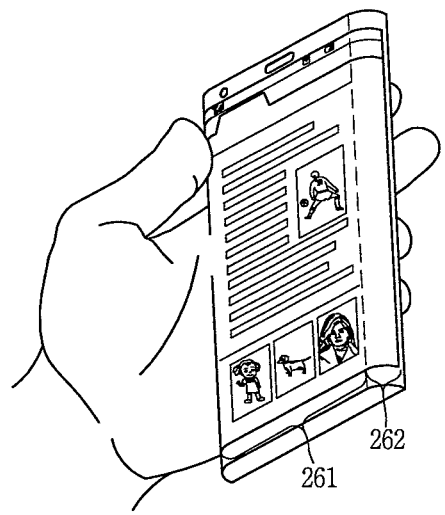

Here, referring to FIG. 16B, a function corresponding to the selected icon may be executed by another touch input which is applied to the first region 261 consecutively after the another touch input. As one example, when a touch is released on one of the first touch and the second touch illustrated with reference to FIG. 16A, the graphic image on which the guide image 278 is output is selected.

In more detail, referring to (a) and (b) of FIG. 16B, when the touch is released, the function corresponding to the selected icon 277b (the forward key in this example) is executed, namely, the webpage is switched into the previous page. Or, referring to (a) of FIG. 16A, when the long touch or tap touch is released in the state that the one icon 277a of the control icon 277 has been selected by the long touch or the tap touch, the function corresponding to the selected icon 277a may be executed. As another example, in the state that the control icon is selected, when another touch input, other than the release of the touch, for example, another tap touch is applied to the first region 261, the function corresponding to the selected icon 277a may be executed.

Figure 17A:
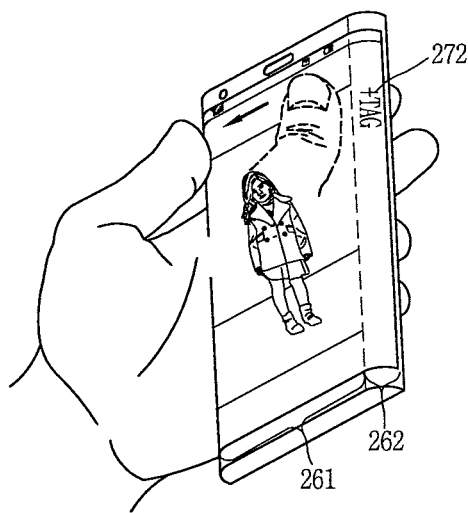
Figure 17A:
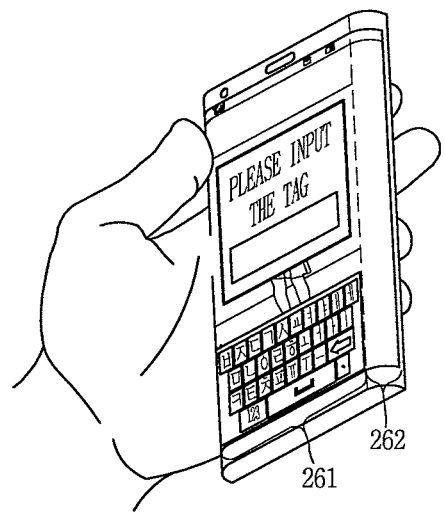
Figure 17B:
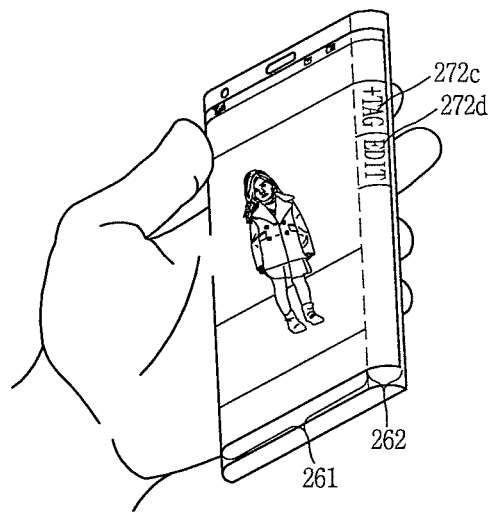
Figure 17B:
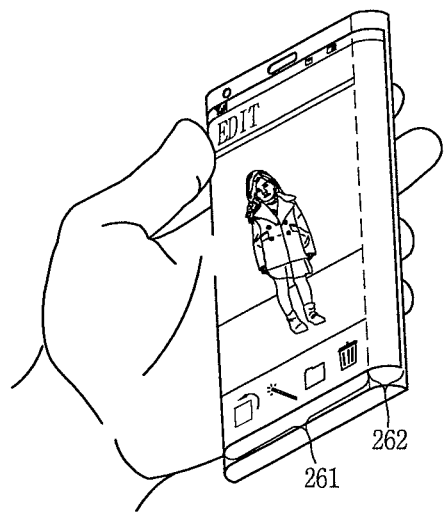

Referring to FIGS. 17A and 17B, a touch input applied to the first region 261 for controlling the information output on the second region 262 may be a drag touch which is applied in a direction from the second region 262 to the first region 261. For example, referring back to FIG. 15A, the image may be output on the first region 261, and the function icon 272 (or the control icon for controlling the image) for selecting the function associated with the image may be output in response to the user's gesture (tilting gesture) tilting the main body such that the side surface faces the user. An icon executing a tagging function is illustrated in (a) of FIG. 17A as an example of the function icon 272. Under this state, the controller 180 can decide the execution of the tagging function, in response to a drag touch applied to the first region 261.

As illustrated in (a) and (b) of FIG. 17A, the drag touch may be defined as a control command applied to a portion adjacent to the second region 262. In more detail, a touch input applied to a point of the first region 261 is processed as a command for controlling the first region 261, and a drag touch started at a portion of the first region 261, which is adjacent to the second region 262, is processed as a command for controlling the second region 262. Therefore, (a) and (b) of FIG. 17A exemplarily illustrate an example that the tagging function is executed, in response to a drag touch which is started at an edge of the first region 261 and extends in a direction getting away from the second region 262. In more detail, when the terminal is tilted and the function icon 272 (the icon executing the tagging function) is output on the second region 262, when a drag touch is applied to the edge of the first region 261 adjacent to the second region 262, an input window on which a content for tagging is input is output along with a virtual keyboard.

Here, with regard to the drag touch applied to the portion (edge) of the first region 261 adjacent to the second region 262, a region for receiving the drag touch may be limited in relation to icons. Referring to (a) of FIG. 17B, a plurality of function icons 272c and 272d are output on the second region 262. One of the plurality of function icons 272c and 272d is selected in response to a drag touch applied to the first region 261 such that a function associated with the selected icon is executed. In this instance, the selected icon may be decided according to which point of the first region the drag touch is applied. For example, as illustrated, when an image is output on the first region 261 and an icon 272c for executing a tagging function and an icon 272d for executing an edit function are output on the second region 262, a touch input may be applied to the first region 261. When the touch input is applied to a portion adjacent to the icon 272c executing the tagging function, the tagging function is executed. When the touch input is applied to a portion adjacent to the icon 272d executing the edit function, the edit function is executed. As a more concrete example, the edit function is executed in response to a drag touch which is started from a portion adjacent to the icon 272d executing the edit function on the first region. In response to the execution of the edit function, the image output on the first region 261 is switched into an execution screen for editing the image. As described above, the interlocking of the front and side display units allows for providing a new type of user convenience.

The aforementioned present disclosure can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a main body having front, side and rear surfaces;
a sensor configured to sense a movement of the main body;
a display unit including a first region located on the front surface and a second region extending from the first region and located on the side surface; and
a controller configured to:
display first information on the first region of the display unit,
activate the second region when the movement of the main body meets a preset condition in a deactivated state of the second region, wherein the movement of the main body meeting the preset condition is a movement that the main body is tilted from an initial position in a first direction,
display second information associated with the first information on the second region, receive a touch input applied to the first region in a state of that the second information is displayed on the second region, and process the touch applied to the first region as a control command for one of the first region and the second region in response to the main body being tilted in a second direction opposite to the first direction to the initial position, wherein the control command is processed to control the second region if the touch input is applied to the first region in a state of that the main body has moved due to being tilted in the first direction, wherein the control command is processed to control the first region if the main body is tilted in the second direction opposite to the first direction, after being tilted in the first direction, wherein when the control command is processed to control the second region, the control command does not control the first information displayed on the first region, and wherein when the control command is processed to control the first region, the control command does not control the second information displayed on the second region.

2. The mobile terminal of claim 1, wherein the controller is further configured to change at least part of the second information displayed on the second region, in response to the touch input applied to the first region.

3. The mobile terminal of claim 2, wherein the controller is further configured to process the touch input applied to the first region while the second region is activated as a scroll function with respect to the second information.

4. The mobile terminal of claim 3, wherein the controller is further configured to scroll the second information by a touch length of a drag touch applied to the first region while the second information is displayed on the second region.

5. The mobile terminal of claim 1,
wherein the controller is further configured to deactivate the second region when the main body is tilted in a second direction opposite to the first direction after the second region is activated by the tilting in the first direction.

6. The mobile terminal of claim 1, wherein the controller is further configured to display control information on the second region for controlling functions associated with the first information displayed on the first region, wherein the control information output on the second region comprises selectable graphic images, and wherein at least one of the graphic images is selected in response to a touch input applied to the first region.

7. The mobile terminal of claim 6, wherein the controller is further configured to execute a function associated with a selected graphic image and display executed function screen information related to the executing function on the first region.

8. The mobile terminal of claim 7, wherein the touch is a drag touch applied in a direction moved from the second region to the first region.

9. The mobile terminal of claim 6, wherein the controller is further configured to:

display a guide image on one of the graphic images included in the second region when a first touch is applied to the first region, move the guide image from the one graphic image to another graphic image when a second touch, consecutive to the first touch, is applied to the first region and dragged in one direction while the guide image is output, and select the graphic image on which the guide image is displayed when the first or second touch is released.

10. The mobile terminal of claim 9, wherein the first touch is a tap touch maintained for more than a preset time.

11. The mobile terminal of claim 10, wherein the controller is further configure to:

arrange the graphic images on the second region along a lengthwise direction of the main body, and move the guide image output on the one graphic image to another graphic image along the direction that the second touch is applied.

\* \* \* \* \*